United States Patent
Kang et al.

(10) Patent No.: US 10,528,087 B2
(45) Date of Patent: Jan. 7, 2020

(54) DISPLAY DEVICE, DOOR INCLUDING THE SAME, AND REFRIGERATOR INCLUDING THE DOOR

(71) Applicant: SAMSUNG ELECTRONICS CO., LTD., Suwon-si (KR)

(72) Inventors: Kun Sok Kang, Suwon-si (KR); Ho June Yoo, Seoul (KR); Kyung-Hoon Lee, Seoul (KR); Nak-Won Choi, Gwangmyeong-si (KR); Sang On Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/270,677

(22) Filed: Sep. 20, 2016

(65) Prior Publication Data

US 2017/0089632 A1    Mar. 30, 2017

(30) Foreign Application Priority Data

Sep. 24, 2015   (KR) .................. 10-2015-0135605

(51) Int. Cl.
   *A47F 3/04*   (2006.01)
   *G06F 1/16*   (2006.01)
   (Continued)

(52) U.S. Cl.
   CPC .......... *G06F 1/1677* (2013.01); *A47F 3/0426* (2013.01); *A47F 3/0434* (2013.01); *F25D 23/028* (2013.01); *G06F 3/14* (2013.01); *G09F 9/35* (2013.01); *G09F 23/065* (2013.01); *G09G 5/003* (2013.01); *A47F 3/001* (2013.01);
   (Continued)

(58) Field of Classification Search
CPC .. A47F 3/00–147; G06F 1/1613–1622; G06G 1/1677
See application file for complete search history.

(56) References Cited

U.S. PATENT DOCUMENTS 4,412,292 A    10/1983   Sedam et al.
4,970,870 A    11/1990   Midlang et al.
(Continued)

FOREIGN PATENT DOCUMENTS

CN    1556664 A    12/2004
CN    1657853 A    8/2005
(Continued)

OTHER PUBLICATIONS

Communication dated Apr. 15, 2015 issued by the Australian Patent Office in Australian Patent Application No. 2011321257.
(Continued)

*Primary Examiner* — Gene W Lee
(74) *Attorney, Agent, or Firm* — Sughrue Mion, PLLC

(57) ABSTRACT

A display device, a door including the display device and a refrigerator including the door are provided. A display device includes: a frame configured to be rotatably mounted to a base object; a display panel mounted to the frame; a detector disposed in the frame, and configured to detect a movement of the frame and output a signal corresponding to the movement; and a controller configured to determine a movement state of the frame based on the signal, and control the display panel based on the movement state.

20 Claims, 29 Drawing Sheets

(51) Int. Cl.

| | | |
|---|---|---|
| *F25D 23/02* | (2006.01) | |
| *G06F 3/14* | (2006.01) | |
| *G09G 5/00* | (2006.01) | |
| *G09F 9/35* | (2006.01) | |
| *G09F 23/06* | (2006.01) | |
| *A47F 3/00* | (2006.01) | |
| *F25D 27/00* | (2006.01) | |
| *G06F 3/041* | (2006.01) | |
| *G09G 3/34* | (2006.01) | |
| *G09G 3/36* | (2006.01) | |
| *F25D 29/00* | (2006.01) | |

(52) U.S. Cl.
CPC ............ *F25D 27/005* (2013.01); *F25D 29/00* (2013.01); *F25D 2400/18* (2013.01); *F25D 2400/36* (2013.01); *F25D 2400/361* (2013.01); *F25D 2700/02* (2013.01); *F25D 2700/06* (2013.01); *G06F 3/0412* (2013.01); *G09G 3/3406* (2013.01); *G09G 3/3648* (2013.01); *G09G 2300/04* (2013.01); *G09G 2320/0626* (2013.01); *G09G 2320/08* (2013.01); *G09G 2330/021* (2013.01); *G09G 2370/10* (2013.01); *G09G 2370/16* (2013.01); *G09G 2380/00* (2013.01)

(56) References Cited

U.S. PATENT DOCUMENTS

| | | | |
|---|---|---|---|
| 5,589,958 A | 12/1996 | Lieb | |
| 5,712,621 A * | 1/1998 | Andersen | G08B 13/08 324/207.16 |
| 6,182,050 B1 | 1/2001 | Ballard | |
| 6,208,976 B1 | 3/2001 | Kinebuchi et al. | |
| 6,271,751 B1 * | 8/2001 | Hunt | E05C 19/166 324/260 |
| 6,359,270 B1 | 3/2002 | Bridson | |
| 6,377,228 B1 | 4/2002 | Jenkin et al. | |
| 6,427,772 B1 | 8/2002 | Oden et al. | |
| 6,504,580 B1 | 1/2003 | Thompson et al. | |
| 6,843,011 B2 | 1/2005 | Hillstrom | |
| 6,950,095 B2 | 9/2005 | Kim et al. | |
| 7,164,432 B1 * | 1/2007 | Amemiya | G06F 1/1616 345/649 |
| 7,391,397 B2 | 6/2008 | Sato et al. | |
| 7,596,899 B1 | 10/2009 | Michael et al. | |
| 7,812,724 B2 * | 10/2010 | Boss | G06F 21/88 340/568.1 |
| 8,149,225 B2 | 4/2012 | Lee | |
| 8,219,152 B2 | 7/2012 | Oh et al. | |
| 8,253,563 B2 * | 8/2012 | Burnard | B60R 25/10 340/541 |
| 8,290,595 B2 | 10/2012 | Kieval et al. | |
| 8,400,607 B2 | 3/2013 | Cappaert et al. | |
| 8,493,364 B2 | 7/2013 | Charlier et al. | |
| 8,582,282 B2 | 11/2013 | Kim et al. | |
| 8,758,524 B2 | 6/2014 | Backherms et al. | |
| 9,062,911 B2 | 6/2015 | Keller et al. | |
| 9,164,581 B2 | 10/2015 | Robinson et al. | |
| 9,311,834 B2 | 4/2016 | Lee et al. | |
| 9,910,518 B2 * | 3/2018 | Bliss | G05B 23/0216 |
| 2002/0003531 A1 | 1/2002 | Kim et al. | |
| 2002/0018027 A1 * | 2/2002 | Sugimoto | G06F 1/1616 345/1.3 |
| 2002/0181722 A1 * | 12/2002 | Hibino | G06F 1/162 381/92 |
| 2002/0198571 A1 | 12/2002 | Puskas | |
| 2003/0030412 A1 | 2/2003 | Matsuda et al. | |
| 2003/0071941 A1 | 4/2003 | Mizuno | |
| 2003/0103023 A1 | 6/2003 | Ootsuka et al. | |
| 2003/0214619 A1 | 11/2003 | Masuda et al. | |
| 2003/0223025 A1 | 12/2003 | Fujishiro | |
| 2003/0229897 A1 | 12/2003 | Frisco et al. | |
| 2004/0017365 A1 | 1/2004 | Hatano et al. | |
| 2004/0073334 A1 | 4/2004 | Terranova | |
| 2004/0160388 A1 | 8/2004 | O'Keeffe | |
| 2005/0004836 A1 | 1/2005 | Ruttenberg | |
| 2005/0029080 A1 | 2/2005 | Rupp | |
| 2005/0166220 A1 | 7/2005 | McKay | |
| 2005/0168399 A1 | 8/2005 | Palmquist | |
| 2005/0178131 A1 | 8/2005 | Ryu et al. | |
| 2005/0259084 A1 | 11/2005 | Popovich et al. | |
| 2006/0044286 A1 | 3/2006 | Kohlhaas | |
| 2006/0152618 A1 | 7/2006 | Yamasaki | |
| 2006/0192767 A1 | 8/2006 | Murakami | |
| 2006/0250056 A1 * | 11/2006 | Fitzgerald | A47F 3/02 312/249.9 |
| 2007/0016478 A1 | 1/2007 | Hill | |
| 2007/0081344 A1 | 4/2007 | Cappaert et al. | |
| 2007/0189042 A1 | 8/2007 | Pai et al. | |
| 2007/0291015 A1 | 12/2007 | Mori | |
| 2008/0024047 A1 | 1/2008 | Juo et al. | |
| 2008/0048954 A1 | 2/2008 | Lee et al. | |
| 2008/0129059 A1 * | 6/2008 | Chang | E05B 47/02 292/251.5 |
| 2008/0230497 A1 | 9/2008 | Strickland et al. | |
| 2008/0278408 A1 | 11/2008 | Strickland | |
| 2009/0036208 A1 | 2/2009 | Pennington et al. | |
| 2009/0046212 A1 | 2/2009 | Tsubata et al. | |
| 2009/0051531 A1 * | 2/2009 | Boss | G06F 21/88 340/568.1 |
| 2009/0052206 A1 | 2/2009 | Matsui et al. | |
| 2009/0109324 A1 | 4/2009 | Kaplan et al. | |
| 2009/0121970 A1 | 5/2009 | Ozbek | |
| 2009/0167729 A1 * | 7/2009 | Hino | G06F 1/1616 345/204 |
| 2009/0212943 A1 * | 8/2009 | Burnard | B60R 25/10 340/541 |
| 2009/0276319 A1 | 11/2009 | Lungu et al. | |
| 2009/0278766 A1 | 11/2009 | Sako et al. | |
| 2009/0279240 A1 | 11/2009 | Karppanen | |
| 2009/0289874 A1 | 11/2009 | Ha | |
| 2009/0295731 A1 | 12/2009 | Kim et al. | |
| 2009/0295753 A1 | 12/2009 | King et al. | |
| 2010/0018240 A1 | 1/2010 | Hecht et al. | |
| 2010/0056220 A1 | 3/2010 | Oh et al. | |
| 2010/0093401 A1 | 4/2010 | Moran et al. | |
| 2010/0097469 A1 | 4/2010 | Blank et al. | |
| 2010/0141689 A1 | 6/2010 | Johnson | |
| 2010/0152892 A1 | 6/2010 | Gavra et al. | |
| 2010/0157063 A1 | 6/2010 | Basso et al. | |
| 2010/0206204 A1 | 8/2010 | Shimizu et al. | |
| 2010/0227650 A1 | 9/2010 | Kim et al. | |
| 2010/0240988 A1 | 9/2010 | Varga et al. | |
| 2010/0252825 A1 | 10/2010 | Yamazaki et al. | |
| 2010/0253541 A1 | 10/2010 | Seder et al. | |
| 2010/0298032 A1 * | 11/2010 | Lee | G06F 1/1616 455/566 |
| 2011/0041368 A1 | 2/2011 | Chua et al. | |
| 2011/0098849 A1 | 4/2011 | Hudis et al. | |
| 2011/0131610 A1 | 6/2011 | Lee et al. | |
| 2011/0159932 A1 | 6/2011 | Richardson | |
| 2011/0163986 A1 | 7/2011 | Lee et al. | |
| 2011/0173082 A1 | 7/2011 | Breitenbach et al. | |
| 2011/0181792 A1 | 7/2011 | Hammonds | |
| 2011/0184862 A1 | 7/2011 | Lanier et al. | |
| 2011/0216045 A1 * | 9/2011 | Tsuchida | G06F 1/1616 345/204 |
| 2011/0241758 A1 * | 10/2011 | Futter | G06F 1/1616 327/516 |
| 2012/0030726 A1 | 2/2012 | Winter et al. | |
| 2012/0062475 A1 | 3/2012 | Locker et al. | |
| 2012/0086877 A1 | 4/2012 | Kaoh | |
| 2012/0102438 A1 | 4/2012 | Robinson | |
| 2012/0105424 A1 * | 5/2012 | Lee | G09F 9/35 345/212 |
| 2012/0163021 A1 | 6/2012 | Bohn | |
| 2012/0242698 A1 | 9/2012 | Haddick et al. | |
| 2012/0242865 A1 | 9/2012 | Vartanian et al. | |
| 2012/0285089 A1 | 11/2012 | Artwohl et al. | |
| 2013/0099715 A1 | 4/2013 | Fuhge | |

(56) References Cited

U.S. PATENT DOCUMENTS

| | | | | |
|---|---|---|---|---|
| 2013/0271378 A1* | 10/2013 | Hulford | ................... | G06F 3/14 345/168 |
| 2013/0271696 A1 | 10/2013 | Dunn | | |
| 2013/0314348 A1* | 11/2013 | Luo | ...................... | G09G 5/003 345/173 |
| 2014/0007375 A1* | 1/2014 | McRoskey | ............... | E05F 5/02 16/85 |
| 2014/0035850 A1 | 2/2014 | Shin et al. | | |
| 2014/0039730 A1 | 2/2014 | Loubiere | | |
| 2014/0078407 A1* | 3/2014 | Green | ...................... | G09F 9/35 348/836 |
| 2014/0321105 A1* | 10/2014 | Meyer | ................... | A47F 5/0068 362/125 |
| 2015/0220299 A1* | 8/2015 | Kim | ...................... | G06F 3/0488 345/1.3 |
| 2017/0329438 A1* | 11/2017 | Kobel | ................... | B60J 5/0497 |
| 2018/0061374 A1* | 3/2018 | Wygonik | ............. | G06F 1/1616 |

FOREIGN PATENT DOCUMENTS

| | | |
|---|---|---|
| CN | 101223329 A | 7/2008 |
| CN | 101557533 A | 10/2009 |
| CN | 101594403 A | 12/2009 |
| CN | 201476445 U | 5/2010 |
| CN | 101726155 A | 6/2010 |
| CN | 101846434 A | 9/2010 |
| CN | 103578400 A | 2/2014 |
| CN | 203657351 U | 6/2014 |
| EP | 2 681 730 | 9/2012 |
| EP | 2 599 424 A1 | 6/2013 |
| JP | 7-244492 A | 9/1995 |
| JP | 2000-146 A | 1/2000 |
| JP | 2001-356714 A | 12/2001 |
| JP | 2003125904 A | 5/2003 |
| JP | 2003-241680 A | 8/2003 |
| JP | 2004-159964 A | 6/2004 |
| JP | 2005-172301 A | 6/2005 |
| JP | 2006-343374 A | 12/2006 |
| JP | 2007-61446 A | 3/2007 |
| JP | 2009-237493 A | 10/2009 |
| JP | 5071041 B2 | 11/2012 |
| KR | 1236377 C | 1/2006 |
| KR | 10-2010-0003913 A | 1/2010 |
| KR | 1020140062920 A | 5/2014 |
| RU | 2183864 C2 | 6/2002 |
| TW | M334925 U | 6/2008 |
| WO | 02/101188 A1 | 12/2002 |
| WO | 2012/119109 A1 | 9/2012 |
| WO | 2013/056109 A1 | 4/2013 |

OTHER PUBLICATIONS

Communication dated Aug. 21, 2014, issued by the Australian Patent Office in Australian Application No. 2011321257.
Communication dated Feb. 17, 2015, issued by the Russian Patent Office in Russian Application No. 2013119740/12.
Communication dated Sep. 15, 2015 issued by the Japanese Patent Office in Japanese Application No. 2013-536496.
Communication dated Jul. 3, 2015 issued by the Russian Patent Office in Russian Application No. 2013119740.
Communication dated Oct. 22, 2014 issued by the European Patent Office in European Application No. 11836549.3.
Communication dated Dec. 3, 2014, issued by the State Intellectual Property Office of P.R. China in Chinese Application No. 201180063571.4.
International Search Report dated Mar. 23, 2012 in counterpart application No. PCT/KR2011/007347 (PCT/ISA/210).
Notice of Allowance issued in U.S. Appl. No. 13/278,504 dated Dec. 4, 2015.
Office Action issued in U.S. Appl. No. 13/278,504 dated Apr. 25, 2014.
Office Action issued in U.S. Appl. No. 13/278,504 dated Aug. 15, 2013.
Office Action issued in U.S. Appl. No. 13/278,504 dated Feb. 5, 2015.
Office Action issued in U.S. Appl. No. 13/278,504 dated Jul. 1, 2015.
Office Action issued in U.S. Appl. No. 13/278,504 dated Sep. 25, 2014.
Techfresh.net, "Samsung uVending Machines", Internet citation, Jan. 8, 2014, XP 002664085, Retrieved from the Internet: URL: http://web.archive.org/web/20100206151319/http://www.techfresh.net/samsung-uvending-machines/, Retrieved on Nov. 22, 2011.
International Search Report dated Oct. 12, 2016, issued by the International Searching Authority in counterpart International Application No. PCT/KR2016/008029 (PCT/ISA/210).
Communication dated Jul. 6, 2016 by the State Intellectual Property Office of P.R. China in counterpart Chinese Patent Application No. 201180063571.4.
Communication dated Jul. 5, 2016 by Japanese Intellectual Property Office in counterpart Japanese Patent Application No. 2013-536496.
Office Action dated Nov. 7, 2016 by the United States Patent and Trademark Office in U.S. Appl. No. 15/075,877.
Office Action dated May 4, 2017 by the United States Patent and Trademark Office in U.S. Appl. No. 15/075,877.
Anonymous., "Window of Opportunity: Touch screens will enable shoppers to find information", Nov. 4, 1998, Professional Engineering 11, 20, p. 22.
"Futuristic Smart Fridge: Input Ingredients, Receive Recipes!". Jun. 2, 2010. Designs & Ideas on Dornob, (4 Pages Total) https://web-beta.archive.Org/web/20100602233622/http://dornob.com/futuristic-smart-fridge-input-ingredients-receive-recipes/.
Office Action dated Jul. 28, 2017 by the United States Patent and Trademark Office in U.S. Appl. No. 15/075,877.
Communication dated Jun. 16, 2017 by the Korean Intellectual Property Office in counterpart Korean Application No. 10-2011-0040408.
Communication dated May 18, 2017 by the Indonesian Patent Office counterpart Indonesian Application No. W00201302143.
Communication dated Jun. 9, 2017, from the European Patent Office in counterpart European Application No. 11836549.3.
Notice of Allowance dated Sep. 8, 2017 by the United States Patent and Trademark Office in U.S. Appl. No. 15/075,877.
Notice of Allowance dated Jan. 25, 2018 by the United States Patent and Trademark Office in U.S. Appl. No. 15/075,877.
Communication dated Dec. 7, 2017 by the Indonesian Patent Office in counterpart Indonesian Application No. W00201302143.
Communication dated Dec. 28, 2017 by the Korean Intellectual Property Office in counterpart Korean Application No. 10-2011-0040408.
Communication dated Dec. 5, 2017 by the Japanese Patent Office in counterpart Japanese Application No. 2016-217438.
Communication dated Apr. 24, 2018 by the European Patent Office in counterpart European Patent Application No. 16848784.1.
Communication dated Jul. 12, 2018 by the European Patent Office in counterpart European Patent Application No. 16848784.1.
Communication dated May 3, 2018, issued by the State Intellectual Property Office of P.R. China in counterpart Chinese Application No. 201610833709.9.
Notice of Allowance dated Jun. 19, 2018, issued by the United States Patent and Trademark Office in U.S. Appl. No. 15/075,877.
Notice of Allowance dated Aug. 28, 2018 issued by the Canadian Intellectual Property Office in counterpart Canadian Patent Application No. 2815355.
Communication dated Sep. 4, 2018 issued by the Japanese Patent Office in counterpart Japanese Patent Application No. 2016-217438.
Communication dated Jan. 4, 2019, issued by the State Intellectual Property Office of People's Republic of China in counterpart Chinese Application No. 201610833709.9.
Communication dated Jan. 29, 2019, issued by the Indian Intellectual Property Office in corresponding Indian Application No. 3747/DELNP/2013.
Communication dated Dec. 11, 2018 issued by the European Patent Office in counterpart European Patent Application No. 16848784.1.

(56) References Cited

OTHER PUBLICATIONS

Office Action dated Jan. 22, 2019, issued by the U.S. Patent and Trademark Office in U.S. Appl. No. 16/159,163.
Communication dated Apr. 2, 2019 issued by the Japanese Patent Office in counterpart Japanese Application No. 2016-217438.
Communication dated May 9, 2019, issued by the State Intellectual Property Office of P.R. China in counterpart Chinese Application No. 201610833709.9.
Communication dated Sep. 3, 2019 issued by the State Intellectual Property Office of P.R. China in counterpart Chinese Application No. 201680038841.9.

* cited by examiner

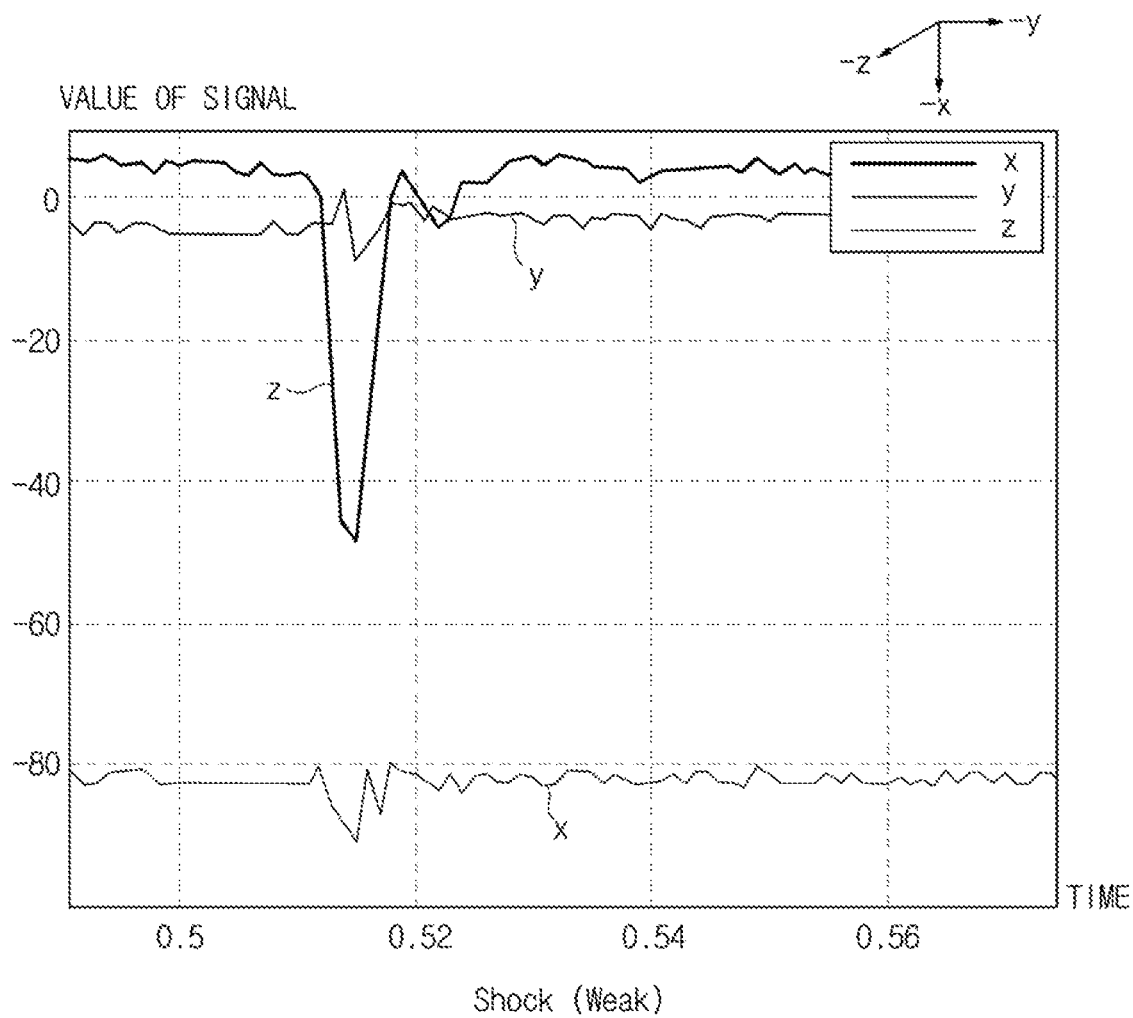

DISPLAY DEVICE, DOOR INCLUDING THE SAME, AND REFRIGERATOR INCLUDING THE DOOR

CROSS-REFERENCE TO RELATED APPLICATION

This application claims priority from Korean Patent Application No. 10-2015-0135605, filed on Sep. 24, 2015 in the Korean Intellectual Property Office, the disclosure of which is incorporated herein by reference in its entirety.

BACKGROUND

1. Field

One or more exemplary embodiments relate to a display device having a display panel on which images are displayed, a door including a display panel, and a refrigerator to which the door is rotatably mounted.

2. Description of the Related Art

Generally, display devices have been rapidly developed from an early cathode ray tube (CRT) type monochrome display device, which has a large volume, to a recent thin film type large-area full color display device.

Also, the information provided by display devices has evolved from simple letters and images to more elaborate and high-definition images.

The conventional display device often occupies a large space when installed at home or public places, causing difficulty in improving space utilization. In addition, the conventional display device may disturb the user's view, deteriorating space aesthetics. As a result, there is a limitation in application of the conventional display device.

However, various methods for obviating the above-mentioned problems of the conventional display devices have been recently proposed.

One such method is to use a transparent display device. For example, a transparent display device is widely used for advertising panels, doors of refrigerators, etc.

SUMMARY

One or more exemplary embodiments provide a display device for controlling image display while movement or motion occurs, a door including the same, and a refrigerator including the door.

One or more exemplary embodiments also provide a display device for scanning the region of a storage chamber and then displaying scan information, a door including the same, and a refrigerator including the door.

According to an aspect of an exemplary embodiment, there is provided a display device including: a frame configured to be rotatably mounted to a base object; a display panel mounted to the frame; a detector disposed in the frame and configured to detect a movement of the frame and output a signal corresponding to the movement; and a controller configured to determine a movement state of the frame based on the signal, and control the display panel based on the movement state.

The detector may include at least one of an acceleration sensor, a gyro sensor, and a geomagnetic sensor.

The controller may be configured to determine a direction of the movement based on the signal, determine that the frame is in an opening state when the determined direction is a first direction, determine that the frame is in a closing state when the determined direction is a second direction, wherein the opening state indicates that the frame is moving away from the base object, and the closing state indicates that the frame is moving closer to the base object.

The display panel may include a backlight unit; and the controller may be configured to control the backlight unit to be dimmed, if the frame is in the opening state.

The display panel may include a backlight unit, and the controller may be configured to control the backlight unit to be turned off, if the frame is in the opening state.

The detector may include an inductance sensor, and the controller may be configured to determine the frame is in the opening state when an inductance value indicated by the signal increases, and determine the frame is in the closing state when the inductance value decreases, wherein the opening state indicates that the frame is moving away from the base object, and the closing state indicates that the frame is moving closer to the base object.

According to an aspect of another exemplary embodiment, there is provided a refrigerator including: a main body including a storage chamber and an opening; and a door rotatably mounted to the main body to open or close the opening, wherein the door includes: a frame; a display panel mounted to the frame; a detector disposed in the frame and configured to detect a movement of the door and output a signal corresponding to the movement; and a controller configured to determine a movement state of the frame based on the signal, and control the display panel based on the movement state.

The detector may be configured to scan an inside of the storage chamber, and the controller may determine an empty region from among plural regions contained in the storage chamber based on a result of scanning of the detector, and control the display panel to display information regarding the determined empty region.

The controller may be configured to control the display panel to change images when the door is determined to be moving based on the signal.

The controller may be configured to control the display panel to display event information when the door is determined to be moving based on the signal.

The controller may be configured to control the display panel to display advertisement information when the door is determined to be moving based on the signal.

The display panel may be a transparent display panel, and the controller may be configured to control a backlight unit of the display panel to be dimmed when the door is determined to be moving based on the signal.

The display panel may be a transparent display panel, and the controller may be configured to control a backlight unit of the display panel to be turned off when the door is determined to be moving based on the signal.

The detector may include at least one of an acceleration sensor, a gyro sensor, and a geomagnetic sensor.

The controller may be configured to determine a direction of the movement of the door based on the signal, determine that the door is in an opening state when the determined direction is a first direction, and determine that the door is in a closing state when the determined direction is a second direction, wherein the opening state indicates that the door is moving away from the main body, and the closing state indicates that the door is moving closer to the main body.

The controller may be configured to: if the determined direction of the signal is the second direction, determine whether there are fluctuations in the signal equal to or more than a predetermined number of times; and if there are fluctuations in the signal equal to or more than a predetermined number of times, determine that the door is in a completely closed state.

The controller may be configured to: if the door is determined to be continuously moving for a predetermined time period based on the signal, control the display panel to change currently displayed images.

The controller may be further configured to reduce brightness of the display panel if the door is determined to be continuously moving for a predetermined time period based on the signal.

The detector may include an inductance sensor, and the controller may be configured to determine that the door is in an opening state, which indicates that the door is moving away from the main body, when an inductance value indicated by the signal increases, and determine that the door is in a closing state, which indicates that the frame is moving closer to the main body, when the inductance value decreases.

According to an aspect of another exemplary embodiment, there is provided a door including: a frame configured to be rotatably mounted to a base object; a display panel mounted to the frame; a detector disposed in the frame and configured to detect a movement of the frame and output a signal corresponding to the movement; and a controller configured to determine a direction of the movement based on the signal, determine whether the door is in an opening state or in a closing state based on the determined direction, and control at least one of a transparency and displayed image of the display panel based on whether the door is in the opening state or in the closing state, wherein the opening state indicates that the frame is moving away from the base object, and the closing state indicates that the frame is moving closer to the base object.

BRIEF DESCRIPTION OF THE DRAWINGS

The above and/or other aspects will become apparent and more readily appreciated from the following description of exemplary embodiments, taken in conjunction with the accompanying drawings of which:

FIGS. 10A to 10C are conceptual diagrams illustrating output signals of an acceleration sensor according to an exemplary embodiment.

DETAILED DESCRIPTION OF EXEMPLARY EMBODIMENTS

Figure 1:
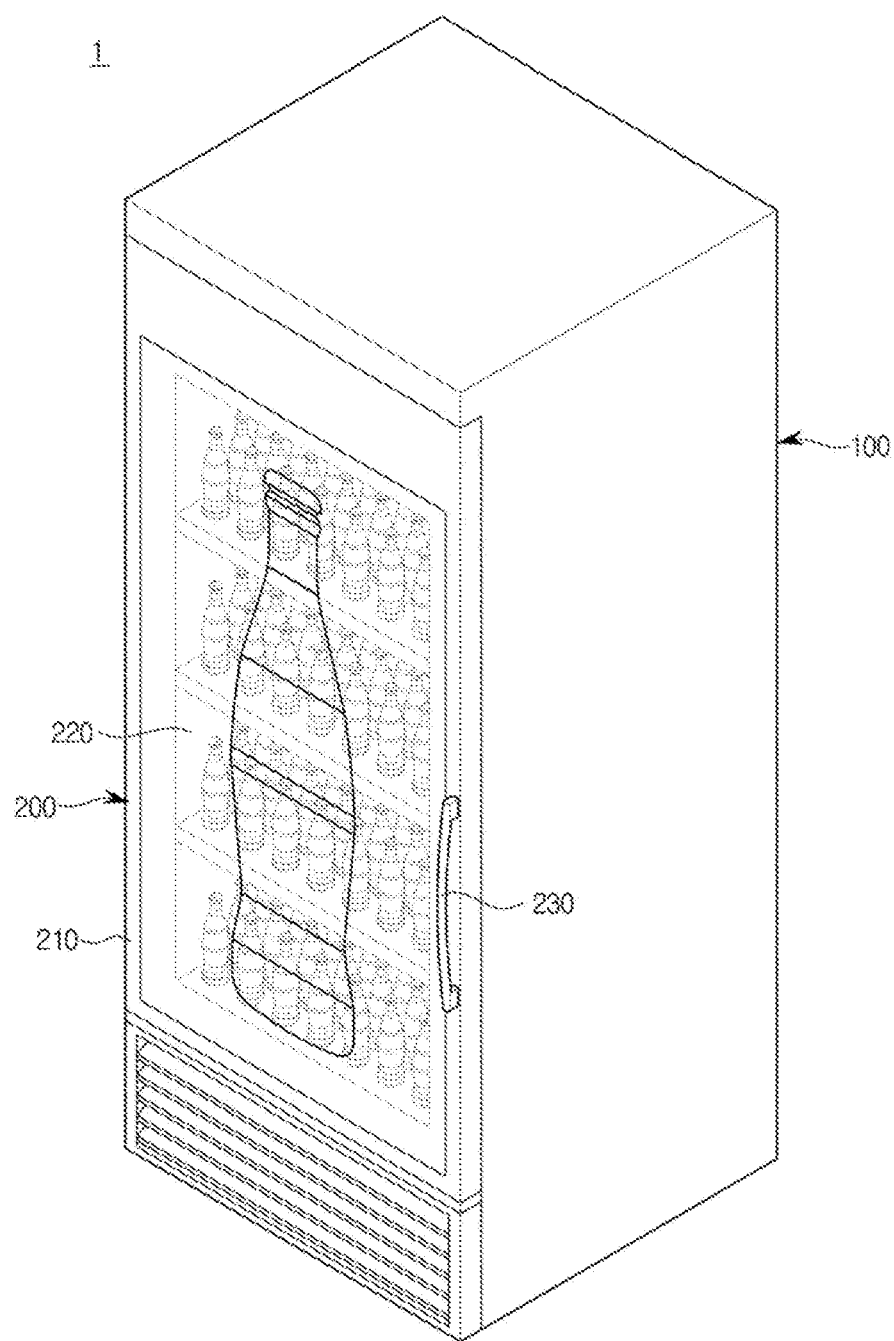
FIG. 1 is a perspective view illustrating a refrigerator including a door according to an exemplary embodiment.

Reference will now be made in detail to the exemplary embodiments of the present disclosure, examples of which are illustrated in the accompanying drawings, wherein like reference numerals refer to like elements throughout.

A display device according to an exemplary embodiment may include a frame, a display panel mounted to the frame so as to display images thereon, a detector disposed in a frame so as to detect movement of the frame, and a drive module disposed in the frame in a manner that a transparent state of the display panel on the basis of frame movement detected by the detector is controlled or image display of the display panel is controlled on the basis of frame movement detected by the detector.

The display device is movably mounted to an advertisement panel or a target object (e.g., a main body), such that the display device may be implemented as a door for opening or closing the opening of the target object, a directional sign, etc.

The exemplary embodiment in which the display device is implemented as a door will hereinafter be described with reference to the attached drawings.

Figure 2:
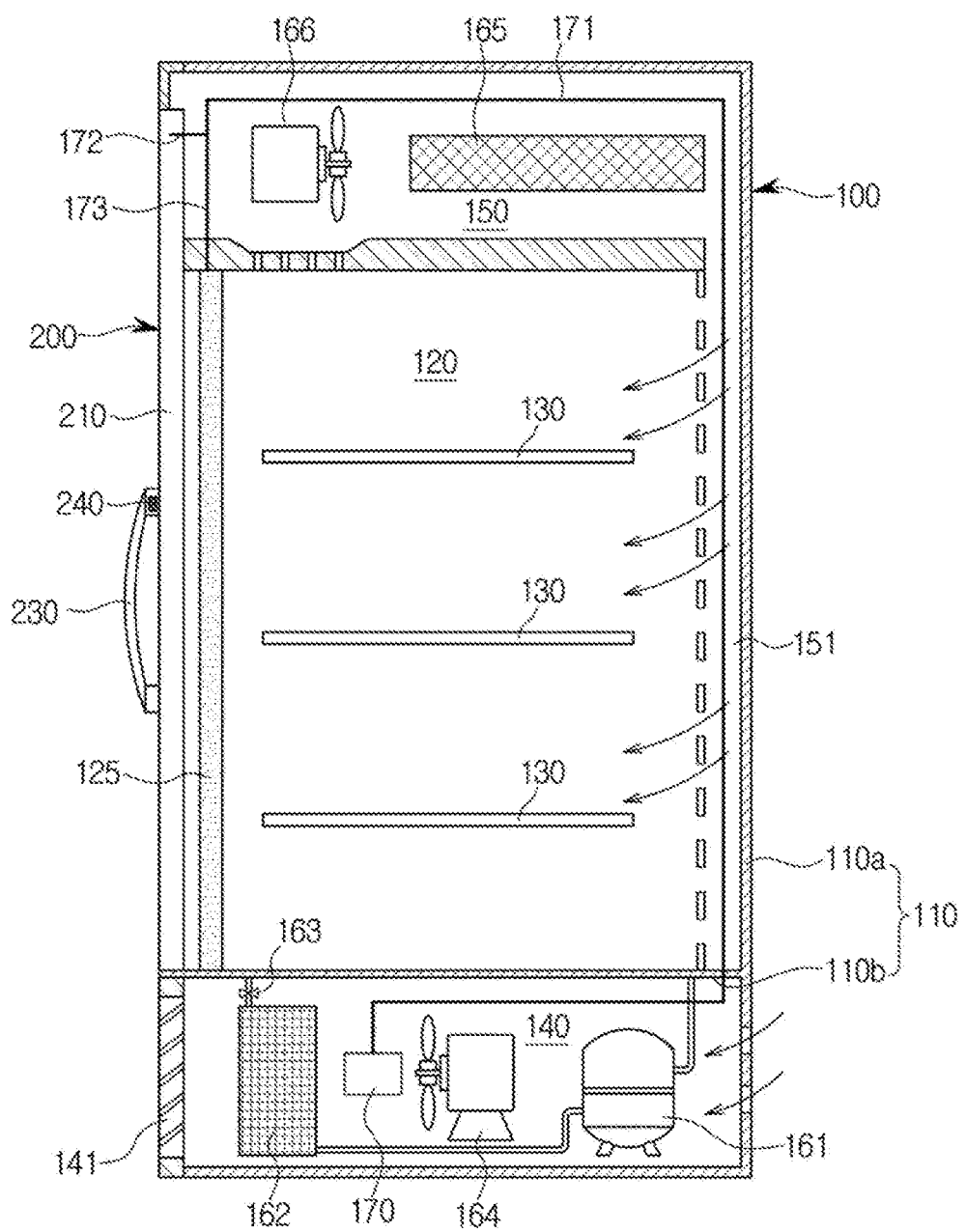
FIG. 2 is a view illustrating an internal structure of a refrigerator including a door according to an exemplary embodiment.
Figure 3:
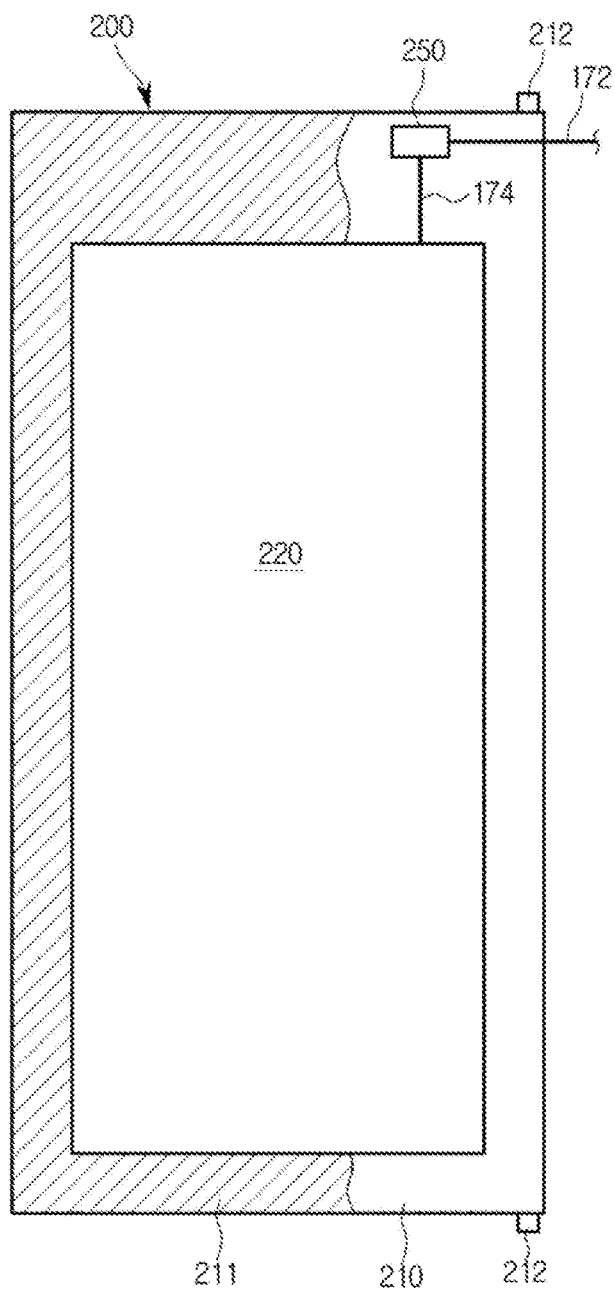
FIG. 3 is a view illustrating a door according to an exemplary embodiment.
Figure 4:
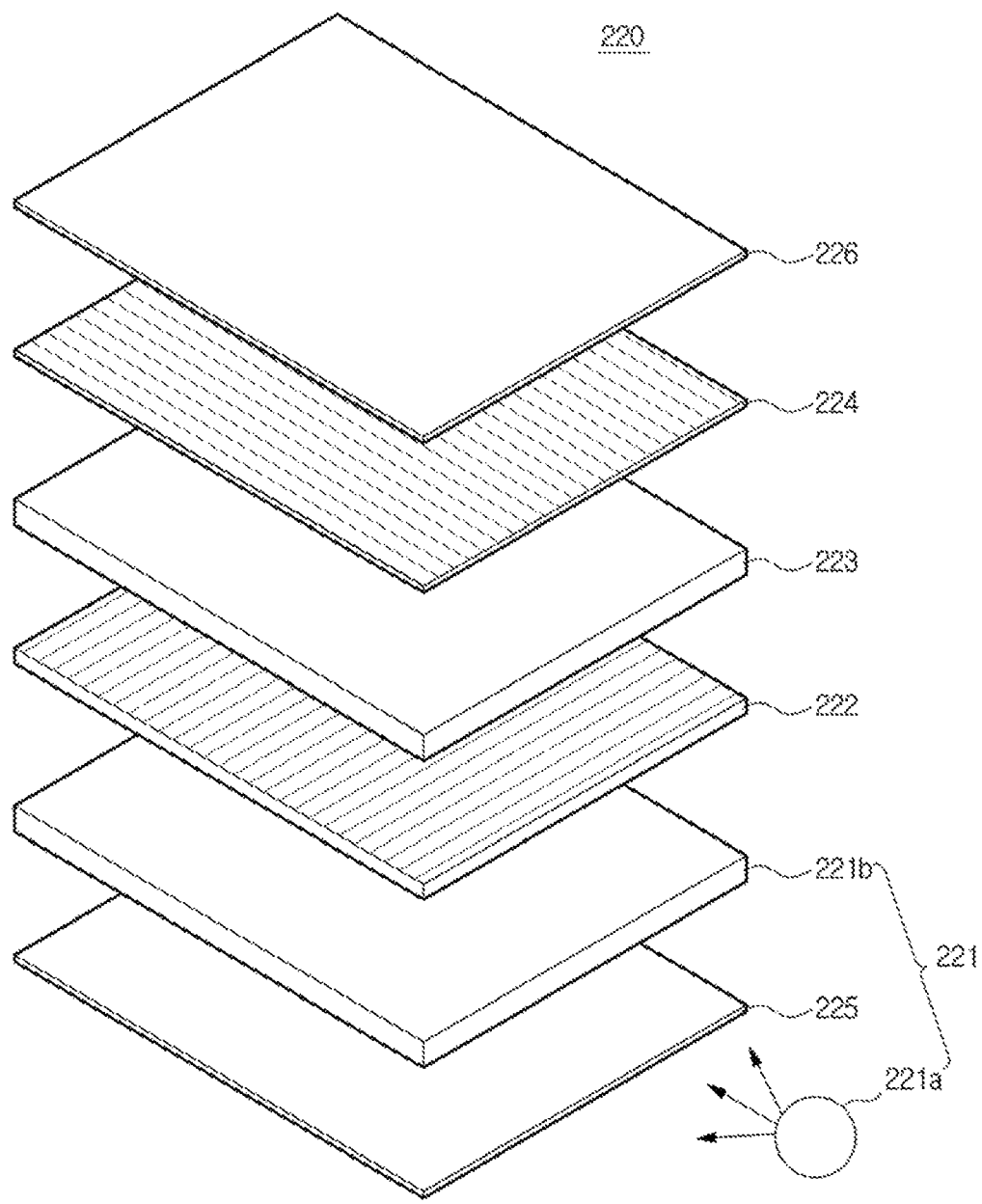
FIG. 4 is a view illustrating a display panel mounted to a door according to an exemplary embodiment.

FIG. 1 is a perspective view illustrating a refrigerator including a door according to an exemplary embodiment. FIG. 2 is a view illustrating an internal structure of a refrigerator including the door according to an exemplary embodiment. FIG. 3 is a view illustrating a door according to an exemplary embodiment. FIG. 4 is a view illustrating a display panel mounted to the door according to an exemplary embodiment.

A door according to an exemplary embodiment may be mounted to a refrigerator, as will be described hereinafter with reference to the attached drawings.

Referring to FIGS. 1 and 2, the refrigerator 1 may include a main body 100 which forms the external appearance and has the opening, and a door 200 rotatably mounted to the main body 100 to open or close the opening of the main body 100 while in motion between a first target position and a second target position.

The main body 100 may include an outer wall 100*a* exposed to the outside, and a housing 110 having an inner wall 110*b* connected to the outer wall 110*a*.

The main body 100 may include a storage chamber 120 formed by the inner wall 110*b* of the housing, a light 125 disposed in the storage chamber 120 to adjust indoor brightness, and a plurality of shelves 130 detachably mounted to the storage chamber 130 such that foods are placed on multiple stages through the plurality of shelves. If the door 200 is closed, the storage chamber 130 may be sealed from the outside. If the door 200 is opened, the storage chamber 130 may be exposed to the outside.

The plurality of shelves 130 may divide the storage chamber 120 into a plurality of spaces such that plural foods can be stored and arranged in the storage chamber 120 while being sorted according to individual regions.

The main body 100 may include a machine chamber 140 and a cool air circulation chamber 150. The machine chamber 140 may be formed between the outer wall 110a and the inner wall 110b, may be spatially separated from the storage chamber 120, and may be located below the storage chamber 120. The cool air circulation chamber 150 may be formed between the outer wall 110a and the inner wall 110b, may be spatially connected to the storage chamber 120, and may be located above the storage chamber 120, such that air is circulated between the storage chamber 120 and the cool air circulation chamber 150.

An indoor space of the machine chamber 140 may be opened or closed by a cover 141. The cover 141 may include one or more openings and may be detachably mounted to the machine chamber 140.

The cool air circulation chamber 150 may further include a duct 151 through which cool air flows. The duct 151 may be located at the back surface of the storage chamber 120.

A plurality of holes may be formed at the surface of a wall located between the duct 151 and the storage chamber 120. Cool air may circulate between the duct 151 and the storage chamber 120 through the plurality of holes.

The main body 100 may include a freezing cycle unit 160 disposed in the machine chamber 140 and the cool air circulation chamber 150; and a first power-supplier 170 which is connected to an external commercial power source, converts the commercial power source into power needed to drive respective constituent elements, and provides the respective constituent elements with the converted power.

The freezing cycle unit 160 may include a compressor 161 disposed in the machine chamber 140 to compress refrigerant; a condenser 162 to condense high-temperature and high-pressure refrigerant compressed by the compressor 161; a valve 163 disposed between the condenser 162 and the evaporator 165 in a manner that the valve 163 is opened or closed according to a temperature of the storage chamber 120; and a cooling fan 164 to cool the compressor 161 and the condenser 162 in a manner that ambient air exchanges heat with the condenser 162.

The freezing cycle unit 160 may further include an evaporator 165 disposed in the cool air circulation chamber 150 so that indoor air of the storage chamber 120 is heat-exchanged; and a blowing fan 166 to blow cool air having exchanged heat with the evaporator 165 into the storage chamber 120.

If the valve 163 is opened, refrigerant is supplied from the condenser 162 to the evaporator 165. Here, the evaporator 165 may perform the cooling function in which low-temperature liquid refrigerant is changed to gaseous refrigerant such that ambient latent heat is absorbed.

As a result, ambient air of the evaporator 165 and indoor air of the storage chamber 120 are cooled. In other words, the evaporator 165 may cool indoor air of the storage chamber 120 such that low-temperature air is supplied to the storage chamber 120.

The evaporator 165 and the blowing fan 166 may also be mounted to the duct 151 disposed at the back surface of the storage chamber 120.

The first power-supplier 170 may include a plurality of cables (171, 172, 173).

The cables may include a first cable 171 connected to the first power-supplier, and a second cable 172 and a third cable 173 branched from the first cable 171.

The first power-supplier 170 may provide the door 200 with power through the first cable 171 and the second cable 172, and may also provide the light 125 with power through the first cable 171 and the third cable 173.

The main body 100 may further include a cooling controller configured to control the freezing cycle unit 160 in a manner that indoor air of the storage chamber 120 can be maintained at a target temperature.

The door 200 acting as a hinged door may be rotatably mounted to the opening of the front surface of the main body 100, may be mounted to the opening corresponding to the region of the storage chamber 120 in a manner that the storage chamber 120 can be shielded from the outside so as to prevent cool air from escaping.

That is, through the opening or closing of the door, the user may put food in the storage chamber 120 or may take food out of the storage chamber 120.

Referring to FIG. 1, the door 200 may include a frame 210 to form the border, a display panel 220 disposed in the frame 210 and disposed in the internal region of the frame 210, and a handle member 230 disposed in the frame 210 and grasped by the user.

The frame 210 may include guide holes formed along an outer circumference, and the display panel 220 may be inserted and arranged in the guide holes.

The frame 210 may be arranged at the outer wall of the display panel 220 such that the border of the display panel 220 is achieved.

Referring to FIG. 3, the door 200 may further include a packing unit 211 and one or more hinge units 212. The packing unit 211 may be disposed in the frame 210, may be disposed at the surface contacting the main body 100, such that the frame 210 is in close contact with the main body 100 when the storage chamber 120 is closed. In addition, when the door 200 contacts the main body 100, the packing unit 211 may absorb impact. The hinge units 212 may be respectively arranged at upper and lower parts of one side of the frame 210, and may allow the door 200 to rotate.

In other words, the door 200 may rotate in a forward direction, i.e., an opening direction, and a backward direction, i.e., a closing direction, on the basis of the hinge units arranged at the upper and lower parts of one side of the frame.

The door may allow one side of the frame to move between a first target position and a second target position.

In this case, the first target position may be a position at which the frame stops moving in a completely opened state of the door, and the second target position may be a position at which the frame stops moving in a completely closed state of the door.

Although the door 200 according to the exemplary embodiment illustrated in FIG. 3 is implemented as the hinged door configured to rotate on the basis of one pair of hinge units, it is not limited thereto. For example, the door 200 may also be implemented as the sliding door. The sliding door may open the opening of the main body while simultaneously moving toward the first target position, and may close the opening of the main body while simultaneously moving toward the second target position.

The display panel 220 may be implemented as a transparent display panel configured to display images such that the images are displayed on the basis of movement of the door 200, which may be detected by the detector 240.

The transparent display panel 220 may be, for example, any one of a liquid crystal display (LCD) panel and an organic light emitting diode (OLED) panel. For convenience of description and better understanding of the present disclosure, it is assumed that the transparent display panel 220 is implemented as an LCD.

Referring to FIG. 4, the display panel 220 may include a backlight unit 221, a first polarization plate 222, a liquid crystal panel 223, a second polarization plate 224, a first sheet 225, and a second sheet 226.

The backlight unit 221 may include a light source 221*a* and a light guide plate 221*b*.

The backlight unit according to an exemplary embodiment may be implemented as an edge-type backlight unit including the light source 221*a* arranged in a lateral direction of the light guide plate 221*b*.

The light source 211*a* may be, for example, any one of a lamp (e.g., a cold cathode fluorescent lamp (CCFL) or an external electrode fluorescent lamp (EEFL)), an LED array, a light 125 installed in the storage chamber 120, and natural light.

Light emitted from the light source 211*a* may include circularly polarized light composed of a left-handed polarization component and a right-handed polarization component.

The light guide plate 221*b* may allow light emitted from the light source to be incident upon the first polarization plate 222. The light guide plate 221*b* may include first and second refractive layers. In this case, the second refractive layer may be formed of a medium having a higher refractive index than the first refractive layer, such that light emitted from the light source is fully reflected and the fully reflected light is incident upon the first polarization plate 222 located in the forward direction.

The light guide plate 221*b* may allow natural light to be incident upon the liquid crystal panel 223 through the first refractive layer and the second refractive layer.

Each of the first and second polarization plates (222, 224) may include cholesteric liquid crystals, and the cholesteric liquid crystals of the first and second polarization plates (222, 224) may include a plurality of cholesteric liquid crystal molecules.

In this case, the cholesteric liquid crystal molecules may include a levorotatory screw structure and a dextrorotatory screw structure. In this case, left-handed circularly polarized light may be penetrated and right-handed circularly polarized light may be reflected by cholesteric liquid crystal molecules of the levorotatory screw structure.

In addition, left-handed circularly polarized light may be reflected and right-handed circularly polarized light may be penetrated by cholesteric liquid crystal molecules of the right dextrorotatory screw structure.

Therefore, polarized light penetrated by the first polarization plate 222 may be P waves, and the reflected polarized light may be S waves.

Meanwhile, the S waves reflected by the first polarization plate 222 may be incident upon the light guide plate 221*b*, and the S waves may be reflected by the second refractive layer of the light guide plate 221*b*. In this case, the reflected light may be converted into P waves, and the P waves may be penetrated by the first polarization plate 222. Therefore, the light guide plate 221*b* may serve as the reflection plate.

The liquid crystal panel 223 may include a thin film transistor (TFT) acting as a switching element; a first substrate having a pixel electrode electrically connected to the TFT; black matrices arranged at intervals of a predetermined distance so as to interrupt incident light from the light source; a color filter pattern formed between the black matrices; a second substrate having an overcoat layer formed over the color filter pattern; and a liquid crystal layer implanted between the first substrate and the second substrate.

The liquid crystal panel 223 may adjust light transmittance of liquid crystal cells according to image information received from a drive module 250, resulting in formation of images.

P waves incident from the first polarization plate 222 may pass through or may not pass through the liquid crystal panel 223 according to the driving of liquid crystal cells.

That is, the amount of light transmission may be adjusted according to the driving of liquid crystal cells of the liquid crystal panel 223, such that images having a gray scale may be displayed.

In more detail, the phase of P waves may be changed according to driving of the liquid crystal panel 223. When the P-wave phase is changed to 90°, the maximum light amount may pass through the second polarization plate 224, such that a white gray scale is implemented. When the P-wave phase is changed to 45°, a smaller amount of light may pass through the second polarization plate 224, such that a medium gray scale is implemented.

Therefore, displacement of liquid crystal may be changed according to strength of the electric field applied to liquid crystal cells of the liquid crystal panel 213. The P-wave phase may be changed in the range from 0° to 90° according to such displacement, resulting in implementation of a desired gray scale.

The second polarization plate 224 may be arranged at one side of the liquid crystal panel 223, and may have a polarization axis perpendicular to the first polarization plate 222. Therefore, the phase of polarization of the first polarization plate 222 may be changed according to driving of the liquid crystal of the liquid crystal panel 223, such that light transmission may be adjusted according to the changed polarization phase.

The first sheet 225 may be an insulation sheet arranged at one side (i.e., one side of the light wave guide 221*b*) adjacent to the storage chamber 120 from among both sides of the transparent display panel 220. The first sheet 225 may prevent an indoor temperature of the storage chamber 120 from increasing due to heat generated by driving of the transparent display panel 220.

The second sheet 226 may be a non-reflective coating film arranged at one side (i.e., one side of the second polarization plate 224) exposed outside from among both sides of the transparent display panel 210. The second sheet 226 may prevent light reflection, such that the inside of the storage chamber 120 and images of the transparent display panel 220 can be easily viewed at a side of the showcase or even on a bright sunny day.

If necessary, it may be possible for the display panel 220 to maintain a transparent state by natural light, irrespective of a display drive command.

Referring to FIG. 2, the door 200 may further include a detector 240 disposed in the handle member 230 to detect movement of the door 200 according to change of the door position.

According to an exemplary embodiment, the detector 240 may also be disposed in the frame 210 instead of the handle member 230 of the door.

The door movement may be detected as the storage chamber 120 is opened or closed.

The detector 240 may include one or more sensors, e.g., an acceleration sensor, a gyro sensor, an inductance sensor, and/or a geomagnetic sensor.

Referring to FIG. 3, the door 200 may further include a drive module 250 disposed in a space between the frame 210 and a packing unit 211 so as to control driving of the display panel 220.

In other words, the drive module 250 may be protected from external impact by the frame 210 and the packing 240.

The drive module 250 may also be disposed in the indoor space of the frame 210. In this case, the frame 210 may be formed in a tube shape.

The door 200 may display advertisement information, foodstuff information, event information, etc. on the display panel 220 in response to a command of the drive module 250.

As a result, the user may view advertisements or foodstuff information through the display panel 220 of the door, and at the same time may view various foodstuffs arranged in the storage chamber 120.

Figure 5:
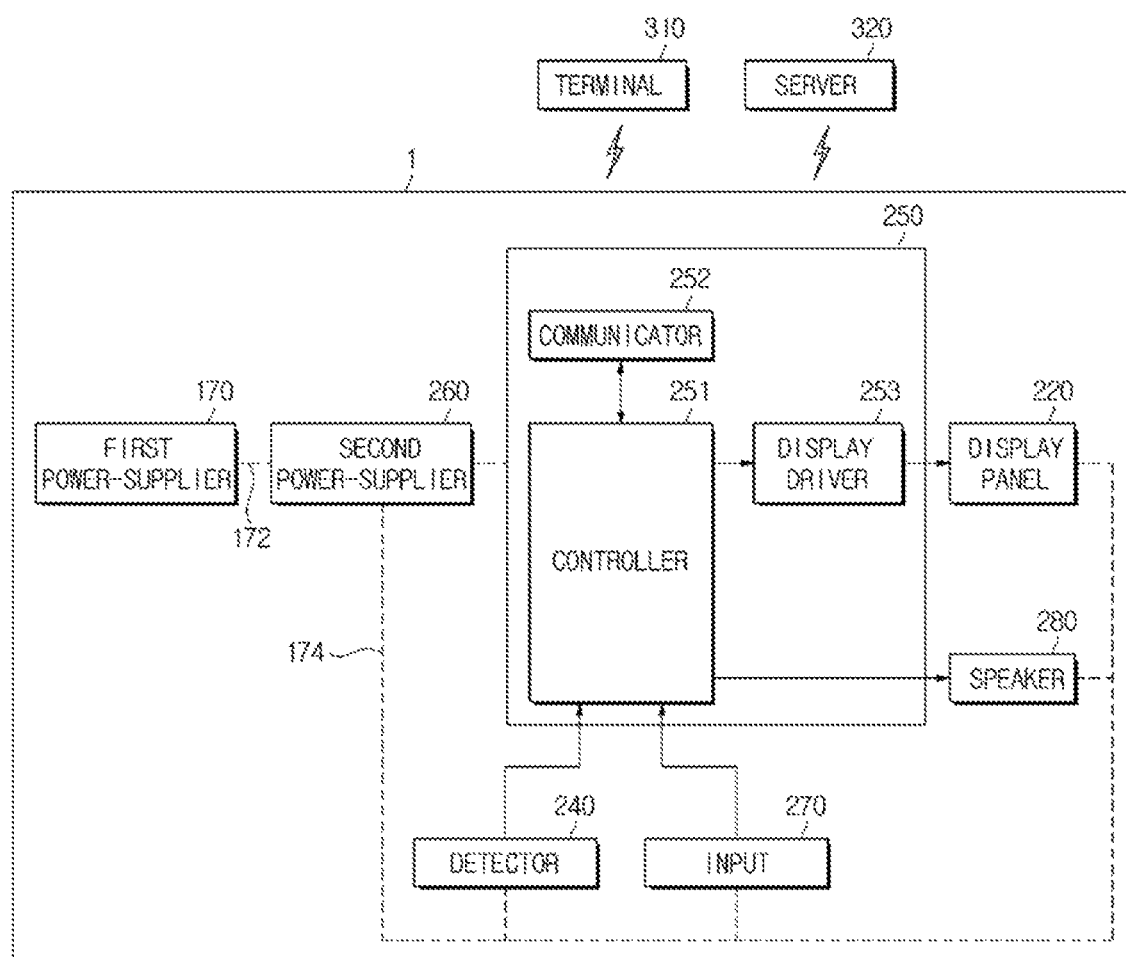
FIG. 5 is a block diagram illustrating a refrigerator including a door according to an exemplary embodiment.

FIG. 5 is a block diagram illustrating a refrigerator according to an exemplary embodiment.

The refrigerator 1 may include a first power-supplier 170, display panel 220, a detector 240, a drive module 250, a second power-supplier 260, an input 270, and a speaker 280. The display panel 220 may be driven by a control signal of the drive module 250.

The first power-supplier 170 may be connected to the external commercial power source such that it receives power from the commercial power source. The first power-supplier 170 may convert the received power into a current or voltage needed to drive the freezing cycle unit 160, and may supply the current or voltage to the freezing cycle unit 160. In addition, the first power-supplier 170 may transmit the supplied power to the second power-supplier 260.

The second power-supplier 260 may receive power from the first power-supplier 170, and may supply the received power to respective constituent elements (e.g., the drive module 250, the display panel 220, the speaker 280, the detector 240, the input 270, etc.) of the door. The second power-supplier 260 may convert the supplied power into a current or voltage needed to drive the respective constituent elements, and may transmit the current or voltage to the respective constituent elements.

The second power-supplier 260 may receive power needed to drive the constituent elements through the cable 172 connected to the first power-supplier 170. In addition, power supplied to the second power-supplier 260 may be transmitted to the display panel 220 through a fourth cable 174.

The second power-supplier 260 may perform AC/DC conversion and DC/DC conversion.

The second power-supplier 260 may also be disposed in the drive module 250 as necessary.

The detector 240 may detect movement of the door 200, and may output a signal corresponding to the door movement.

As aforementioned, the detector 240 may include one or more sensors, e.g., an acceleration sensor, a gyro sensor, an inductance sensor, and/or a geomagnetic sensor.

The acceleration sensor may detect 3-axis acceleration of the moving door and impact strength of the moving door, and may output a signal corresponding to the detected 3-axis acceleration and impact strength.

When the door starts moving from a stop (or idle) state, the acceleration sensor may output a signal corresponding to directional acceleration on the basis of the stop position.

In the stop state, the acceleration sensor may output a reference value of each axis as acceleration of each axis.

Each of reference values of two axes other than the direction of gravity may be approximately zero "0", and gravity may be applied to a reference value of the gravity directional axis.

The movement direction of each axis may include a forward direction corresponding to an opening direction of the door from the stop position and a reverse direction, i.e., a closing direction of the door, which is opposite to the forward direction. Each directional signal may be output as a positive(+) signal or a negative(−) signal.

The gyro sensor may detect 3-axis angular speed (i.e., the number of rotations per unit time) of the rotating door, and may output a signal corresponding to the detected 3-axis angular speed.

When the door starts moving from the stop state, the gyro sensor may output a signal corresponding to angular speed for each direction moving on the basis of the stop position.

In the stop state, the gyro sensor may output a reference value of each axis as the angular speed of each axis.

A reference value of the gravity directional axis may be approximately zero "0".

The movement (i.e., rotation) direction of the gravity directional axis may include a forward direction corresponding to a predetermined direction from the stop position and a reverse direction opposite to the forward direction. Each directional signal may be output as a positive(+) signal or a negative(−) signal.

If magnetic flux is changed according to variation in the distance between the inductance sensor and the housing 110 of the main body contacting the frame 210 of the door, an output signal of the inductance sensor may be changed according to Faraday's law of electromagnetic induction. In more detail, the inductance sensor may detect inductance change of the coil excited at a high frequency, and may output a signal changing in response to the detected inductance change.

The inductance sensor may output a signal indicating change of the distance between the metal main body and the inductance sensor.

The inductance sensor may output a reference value while being in contact with the main body. The separation distance between the inductance sensor and the main body is proportional to inductance change. As a result, the inductance sensor may generate a higher output value.

The output value may indicate the magnitude of a voltage signal or the magnitude of a digital signal.

The geomagnetic sensor may detect strength of a 3-axis magnetic field, and may output a signal corresponding to the detected 3-axis magnetic field.

The drive module 250 may be formed of at least one printed circuit board (PCB).

The drive module 250 may include a controller 251, a communicator 252, and a display driver 253. The controller 251 may include a decision module 251a configured to decide the movement state of the door, and a processor 251b configured to control image display. A detailed description thereof will hereinafter be given with reference to FIG. 6.

Figure 6:
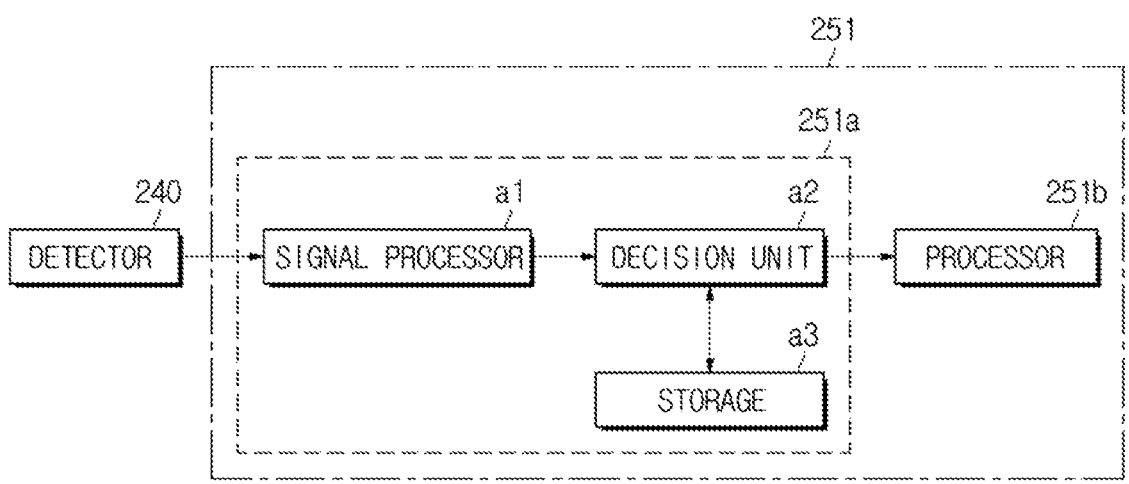
FIG. 6 is a detailed block diagram illustrating a controller contained in a drive module of a door according to an exemplary embodiment.

FIG. 6 is a block diagram illustrating a controller of a drive module of a door according to an exemplary embodiment.

A movement state of the door may include an opening state and a closing state.

The controller 251 may be implemented using a processor, a central processor (CPU), a micro-processor (MCU), etc.

The decision module 251a may include a signal processor (a1) configured to perform signal processing of the output signal of the detector 240; a decision unit (a2) configured to confirm the signal processed value and decide the movement state of the door on the basis of the confirmed value; and a storage (a3) configured to store a reference value for the movement state of the door, the movement direction, and the number of reference fluctuations.

The decision unit (a2) may decide various states of the door, which include, for example, a completely opened state, a completely closed state, a currently opening state, and/or a currently closing state. The movement direction of the door may be used to decide the state of the door.

Detailed description about constituent elements for detecting and deciding the door state will be described later.

The storage (a3) may include a volatile memory in which read/write (R/W) operation of data is possible, and/or a non-volatile memory. The volatile memory may be a random access memory (RAM), SRAM or DRAM. The non-volatile memory may include at least one of flash memory, Read Only Memory (ROM), Erasable Programmable Read Only Memory (EPROM), Electrically Erasable Programmable Read Only Memory (EEPROM), etc.

The processor 251b may control images displayed on the display panel 220 to be changed to other images on the basis of the decided movement state of the door.

The processor 251b may control the direction of images displayed on the display panel 220 to be inverted on the basis of the decided movement state of the door.

The processor 251b may perform dimming of the backlight unit mounted to the display panel 220 or may switch off the backlight unit according to the decided movement state of the door.

If necessary, the processor 251b may also change a transparent state (e.g., an opaque, transparent or semi-transparent state) on the basis of the decided movement state of the door.

The processor 251b may control display of any one of plural images, and may also sequentially display the plural images at intervals of a predetermined time.

The communicator 252 may communicate with the external device, and may transmit information received from the external device to the controller 251.

The communicator 252 may perform at least one of wired communication and wireless communication.

The communicator 252 may receive a command from the external device. The command may include an image change command, an image ON/OFF command, and a command for updating various images (e.g., an advertisement image, an event image, and a coupon image).

The above images may further include format information indicating a format of the images, for example, pictures, photos, words, and moving images.

The external device may include a terminal (or user equipment: UE) 310 and a server 320.

The terminal 310 may perform wireless communication (e.g., Wi-Fi or Bluetooth) with the communicator 252, and the server 320 may perform at least one of wired communication and wireless communication with the communicator 252.

The terminal 310 may directly control the display panel 220 using an administrator's terminal.

If the terminal 310 is a smartphone, an application for controlling display of the showcase may be installed in the smartphone. This application may be downloaded from an Application Store or a server, and may also be upgraded and updated.

A display driver 253 may be driven by a command of the controller 251 in a manner that images can be displayed on the display panel 220.

In other words, the display driver 253 may drive liquid crystal cells of the liquid crystal panel 223 in response to a command of the controller 251, such that images can be displayed on the display panel 220 and transparency can be adjusted.

The input 270 may receive the ON/OFF commands of the display panel, an image display command of the display panel, and an image update command, etc.

The input 270 may also receive an image display mode as necessary.

The image display mode may include a transparent mode, an opaque mode, a semi-transparent mode, an advertisement mode, an event mode, a product information display mode, etc.

The speaker 280 may output a sound signal corresponding to the image displayed on the display panel 220.

If necessary, the speaker 280 may output a user-selected song or a user-selected melody as a background sound.

If necessary, the speaker may also output a sound signal indicating information regarding the product stored in the storage chamber of the main body.

A structure for deciding a state of the door 200 on the basis of signals detected by the detector 240 will hereinafter be described with reference to FIGS. 7 to 13.

Figure 7:
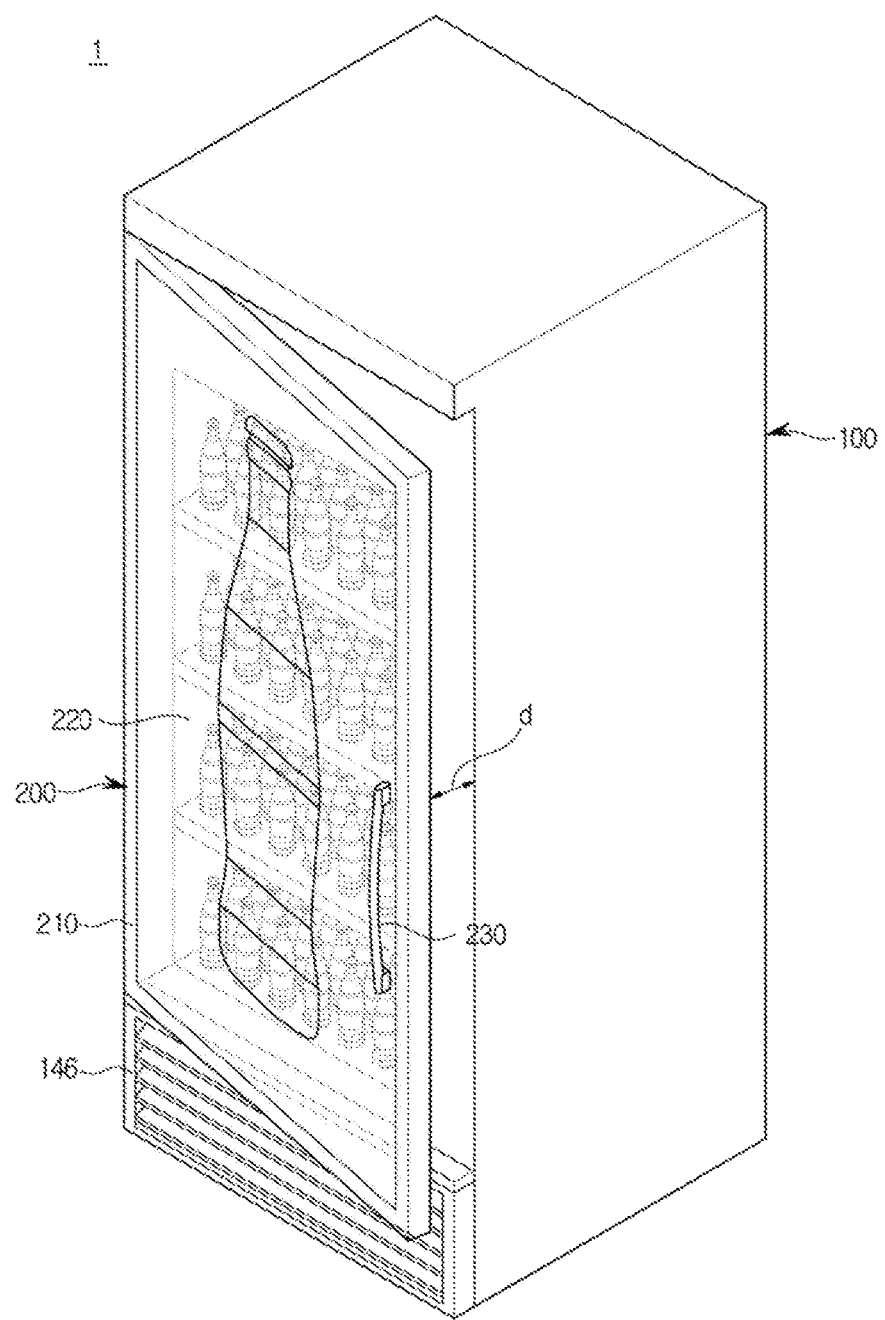
FIG. 7 is a perspective view illustrating a refrigerator having an opened door according to an exemplary embodiment.

Referring to FIG. 7, when the door is opened by a predetermined distance d, it may be determined whether the door is continuously opened or closed on the basis of the signals detected by the detector 240.

That is, the drive module 250 may recognize the change of the door's position, and may determine the movement direction according to two positions (i.e., the current position and the previous position of the door).

(1) Structure for Detecting Door Movement and Door State Using the Acceleration Sensor The structure for detecting the door's movement and the door's state using the acceleration sensor will hereinafter be described with reference to FIGS. 8 to 10C. In FIGS. 8 to 10C, it is assumed that the door is implemented as a hinged door.

Figure 8:
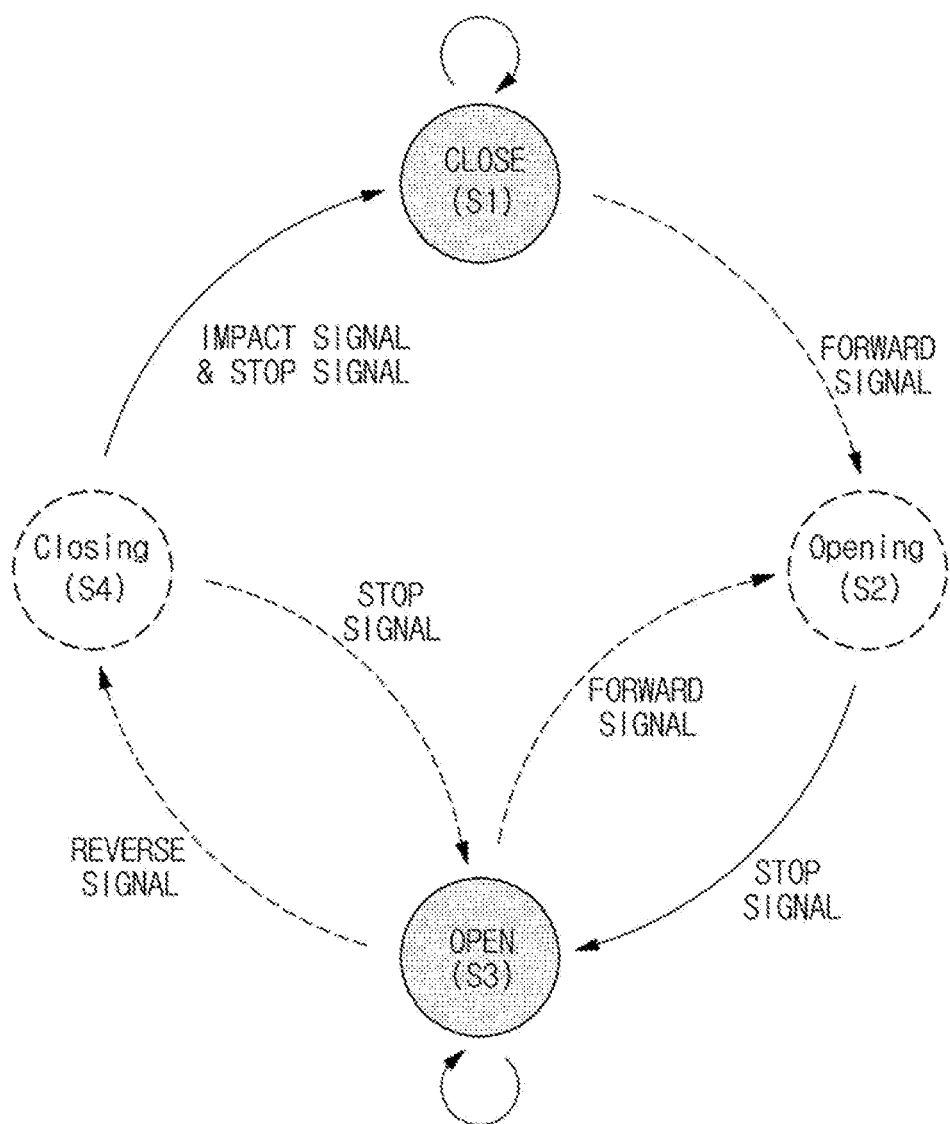
FIG. 8 is a conceptual diagram illustrating output signals of an acceleration sensor according to an exemplary embodiment.

Referring to FIG. 8, the door's state may include a completely closed state (CLOSE: S1), a currently opening state (Opening: S2), a completely opened state (OPEN: S3), and a currently closing state (Closing: S4).

It is assumed that the gravity direction is an X-axis negative direction. It is also assumed that, from a user's perspective facing the door, a right direction is a negative direction, i.e., opening direction, of the Y-axis, a forward direction is a positive direction, i.e., opening direction, of a Z-axis, and the door's initial state is the completely closed state.

Assuming that the door is implemented as a hinged door and there is no vertical movement of the door, the drive module 250 may not use signals of the gravity directional axis from among respective axes' signals received from the detector, when deciding the door's state.

Figure 9A:
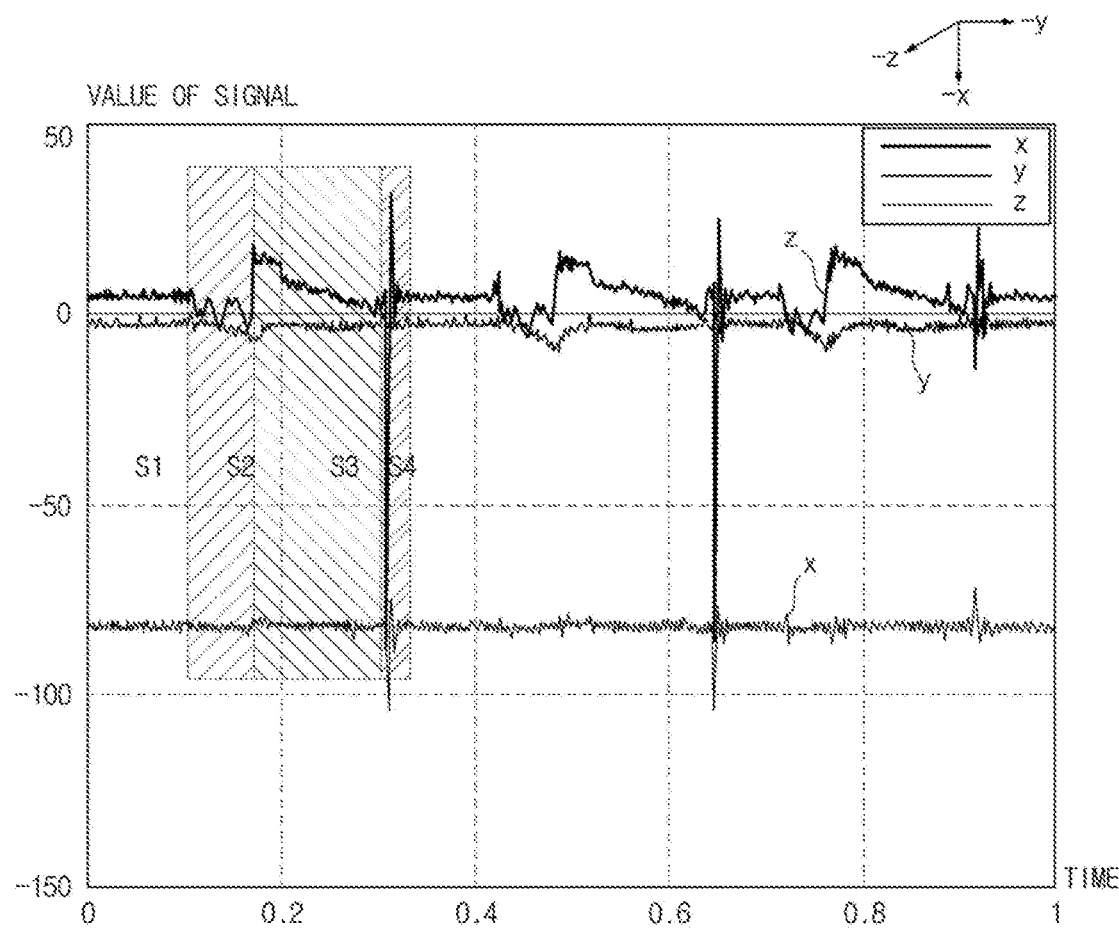
FIGS. 9A and 9B are conceptual diagrams illustrating output signals of an acceleration sensor according to an exemplary embodiment.
Figure 9B:
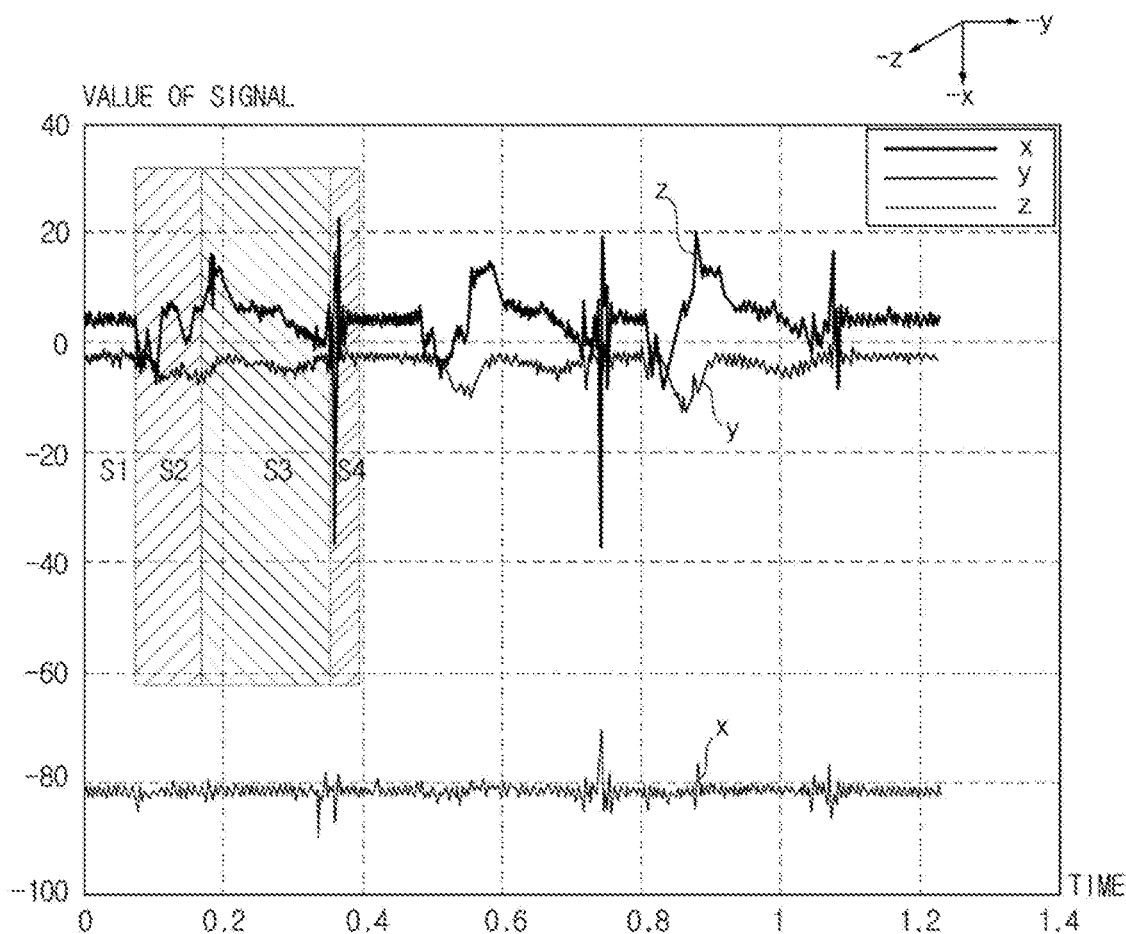

Referring to FIGS. 9A and 9B, assuming that the door is in the completely closed state (S1), this means that the door does not move at all, such that the detector 240 may output individual reference values as Y-axis and X-axis signal values. Here, each reference value may be approximately zero.

The drive module 250 may detect the value of a signal of each axis (Y, Z), received from the detector 240. If the signal value of each axis (Y, Z) is a reference value of each axis (Y, Z), the drive module 250 may determine that the door is continuously maintained in the completely closed state of the door.

If the door is released from the completely closed state (S1) and is moving, the detector 240 may output Y-axis and Z-axis signals corresponding to the door's movement.

The drive module 250 may receive a signal value of each axis (Y, Z) from the detector 240, and may compare the signal value of each axis (Y, Z) with a reference value of each axis (Y, Z). If the signal value of each axis (Y, Z) is less than the reference value of each axis (Y, Z), the drive module 250 may determine that the door is in the currently opening state (S2).

That is, assuming that the signal value of each axis (Y, Z) is a negative(−) value less than zero, the drive module 250 may determine that the door has moved in the forward direction, i.e., the opening direction.

After the door is in the currently opening state (S2) at a first time point, the drive module 250 may detect the signal value of each axis at a second time point which is later than the first time point. If the signal value of each axis (Y, Z) at the second time point is a reference value of each axis, the drive module 250 may determine that the door has moved from the currently opening state to the stop state (i.e., the completely opened state) S3. If the signal value of each axis at the second time point is a negative(−) value less than a reference value of each axis, the drive module 250 may determine that the door has further moved in the opening direction.

That is, the drive module 250 may determine that the door is continuously being opened, remaining in the currently opening state (S2).

For example, if the door is opened by a first distance at a first time point and is in the currently opening state at a second time point which is later than the first time point, this means that the door is now opened by a second distance which is longer than the first distance. In addition, assuming that the door is in the currently opening state at a third time point, this means that the door is opened by a third distance which longer than the second distance.

That is, it may be determined that the door is first opened by the first distance, stops moving, is then opened by a second distance, stops moving, and is finally opened by a third distance.

In this case, the first distance, the second distance, or the third distance may indicate the distance between the housing of the main body and the door's frame.

In addition, when deciding the door's state, the drive module 250 may also determine the door's state using only the signal of one axis from among the signals of two axes (Y, Z).

If the door is released from the currently opening state and then stops moving for a predetermined time or longer, this means that the door is in the completely opened state.

In addition, assuming that a signal received in the currently opening state (S2) of the door has a negative(−) value less than the reference value and the next reception signal is an impact signal, the drive module 250 may also determine the completely opened state of the door.

After the drive module 250 determines the currently opening state (S2) of the door, the drive module 250 may detect the signal value of each axis at a second time point which is later than the first time point, and may compare the signal value of each axis (Y, Z) of the second time point with the reference value of each axis. If the signal value of each axis is higher than the reference value of each axis, the drive module 250 may determine the currently closing state of the door.

That is, assuming that the signal value of each axis (Y, Z) is a positive(+) value greater than zero, the drive module 250 may determine that the door has moved in the closing direction.

After the drive module 250 determines the currently closing state of the door, the drive module 250 may detect the signal value of each axis. If the signal value of each axis (Y, Z) is the reference value, the drive module 250 may determine that the door is released from the currently closing state and then stops moving. In this case, the door is still opened.

If the signal value of each axis is higher than the reference value of each axis while the door is in the stop state S3, the drive module 250 may determine that the door has moved in the closing direction. In this case, the drive module 250 may determine that the door is in the currently closing state S4.

For example, if the door is opened by a first angle at a first time point, and the door is then in the currently closing state at a second time point, this means that the door is now opened by a second angle which is less than the first angle. In addition, if the door is in the currently closing state at a third time point, this means that the door is opened by a third angle less than the second angle.

That is, the door is opened by the first angle, stops moving, closed a little until the door is opened by the second angle, stops moving, and closed until the door is opened by the third angle.

Since the door is opened before reaching the completely closed state, the opening angle of the door may be gradually reduced in the currently closing state.

If the signal value of each axis is less than the reference value of each axis, the drive module 250 may determine that the door has moved in the opening direction. In this case, the door may re-enter the currently opening state.

Assuming that the signal value of each axis is higher than the reference value of each axis, the drive module 250 may determine that the door has moved in the closing direction. In addition, assuming that the signal value of each axis is higher than the reference value of each axis, the drive module 250 may determine that the door has moved in the closing direction. Assuming that the signal received in the currently closing state is the impact signal and the tail signal of the impact signal has the same value as the reference value, the drive module 250 may determine the completely closed state S1.

In this case, the above situation in which the tail signal of the impact signal has the same value as the reference value may indicate the stop state of the door.

FIG. 9A is a graph illustrating signal values on a time axis when the door is opened by about 30° and then closed, and FIG. 9B is a graph illustrating signal values on the time axis when the door is opened by about 90° and then closed. Although signal output time points of the detector differ according to the opening angle of the door, it can be recognized that signals having the same directivities are output in response to the movement direction of the door when the door is opened or closed.

When the door 200 is released from the completely closed state and then opened, the detector 240 may output the signal corresponding to the currently opening state. When the door 200 is released from the open state and then closed, the detector 240 may output the signal corresponding to the currently closing state and then output signals having different directivities.

The signal directivity may be recognized by determining whether the corresponding signal is set to any one of a positive(+) signal higher than the reference value or a negative(−) signal less than the reference value.

When the door 200 is in contact with the main body 100, the detector 240 may output the impact signal corresponding to impact between the main body 100 and the door 200.

In this case, the impact signal may include a noise signal caused by external force.

Therefore, the drive module 250 may detect fluctuation of the received signal, and may discriminate between the impact signal caused by the closed door and the noise signal. A detailed description thereof will hereinafter be given with reference to FIGS. 10A, 10B, and 10C.

Figure 10A:
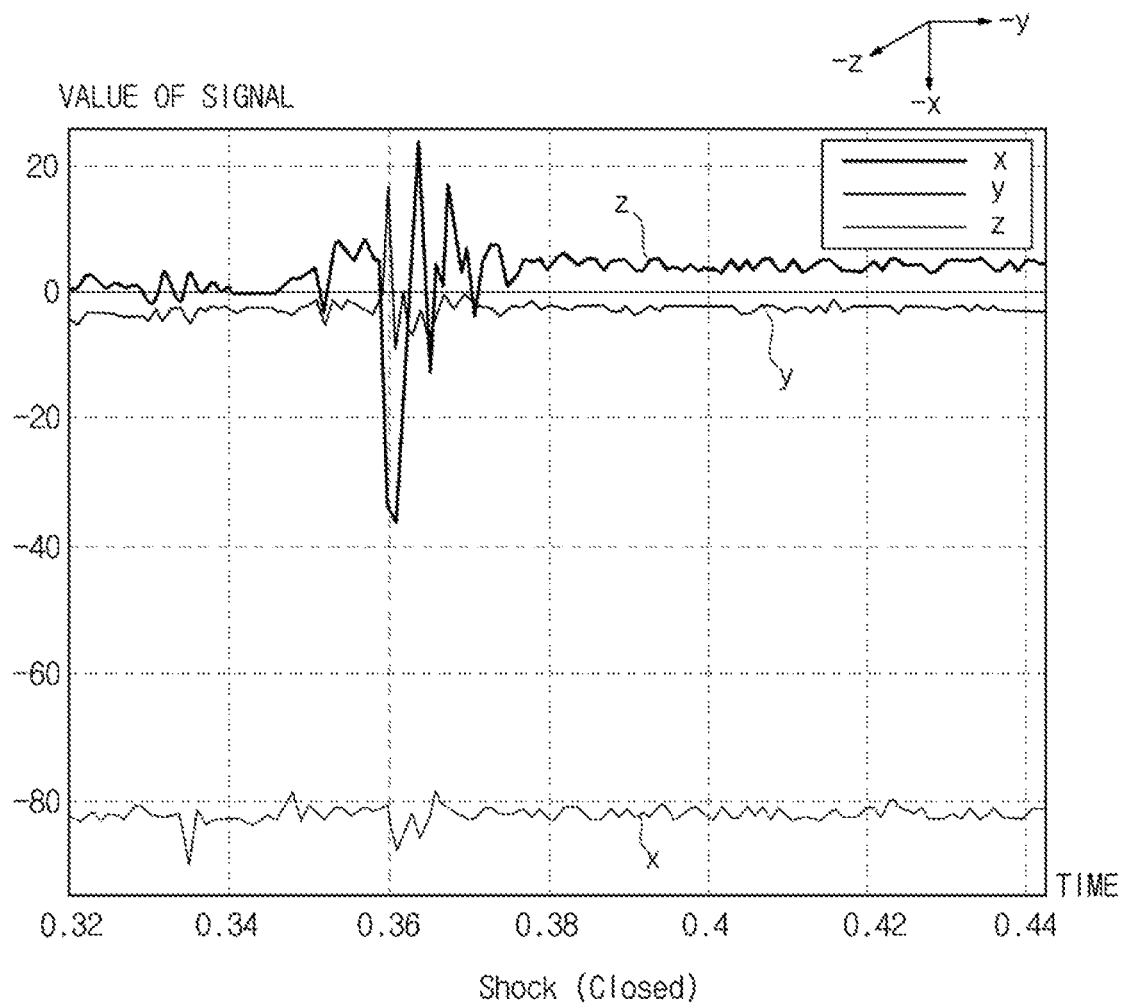
Figure 10C:
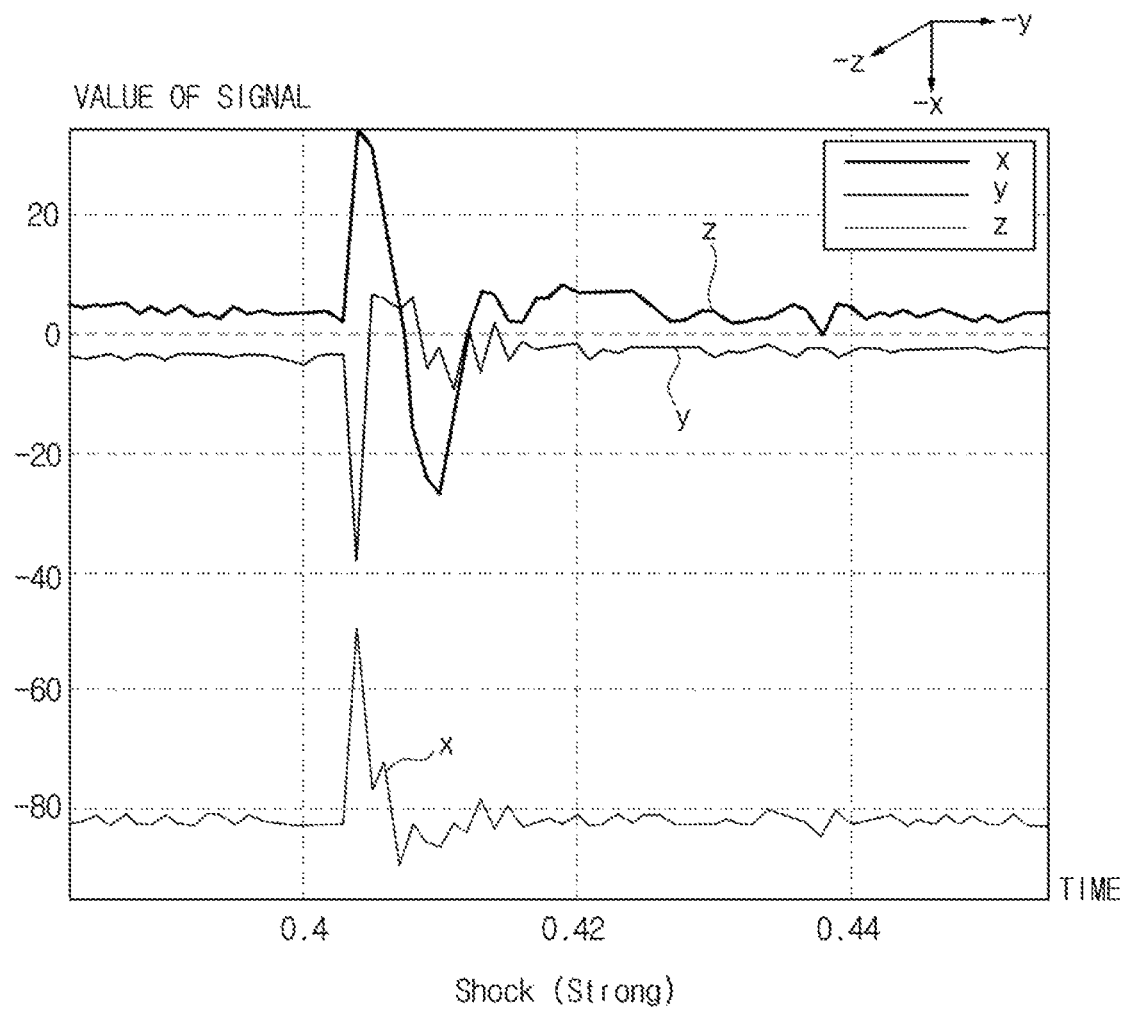

FIG. 10A is a graph illustrating signal values on the time axis when the door collides with the main body by closing the door. FIG. 10B is a graph illustrating signal values on the time axis when weak external force is applied to the door. FIG. 10C is a graph illustrating signal values on the time axis when strong external force is applied to the door.

The drive module 250 may confirm each signal value on the time axis, and may confirm the number of fluctuations according to the change of signal values for a predetermined time. If the number of confirmed fluctuations is equal to or higher than a reference number of fluctuations, the drive module 250 may determine the occurrence of an impact signal caused by closing the door. If the number of confirmed fluctuations is less than the reference number of fluctuations, the drive module 250 may determine the occurrence of a noise signal caused by external force.

In this case, the number of fluctuations may be increased or reduced on the basis of a reference value. For example, the number of fluctuations may be adjusted on the basis of the reference value, such that the number of fluctuations may be equal to or higher than the reference value or may be equal to or less than the reference value.

In this case, the number of fluctuations may be a predetermined number of times obtained by tests and learning.

Even in the case in which the detector is a geomagnetic sensor having X-axis, Y-axis, and Z-axis, the detector may also be implemented in the same manner as in the acceleration sensor.

(2) Structure for Detecting Door Movement and Door State Using the Gyro Sensor

The structure for detecting the door's movement and the door's state using the gyro sensor will hereinafter be described with reference to FIGS. 11A and 11B.

Figure 11A:
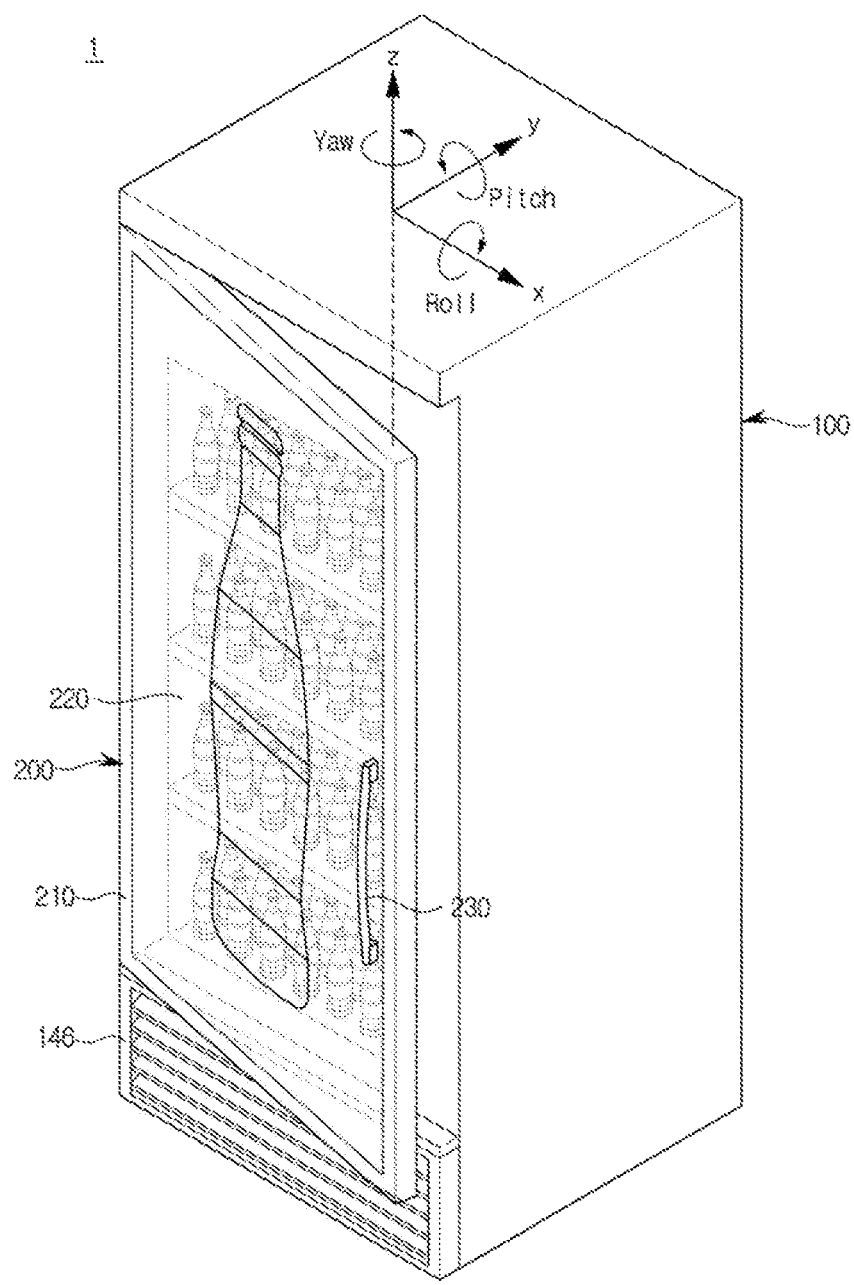
FIGS. 11A and 11B are conceptual diagrams illustrating output signals of a gyro sensor according to an exemplary embodiment.

Referring to FIG. 11A, the gyro sensor may include a rotation shaft composed of X-, Y-, and Z-axes. In this case, when the door is pulled, it is assumed that a horizontal axis is denoted by the X-axis, a forward and backward directional axis is denoted by the Y-axis, and the gravity directional axis is denoted by the Z-axis.

It is assumed that the door is implemented as a hinged door that moves around the gravity direction through the hinge, and the initial state of the door is the completely closed state.

Figure 11B:
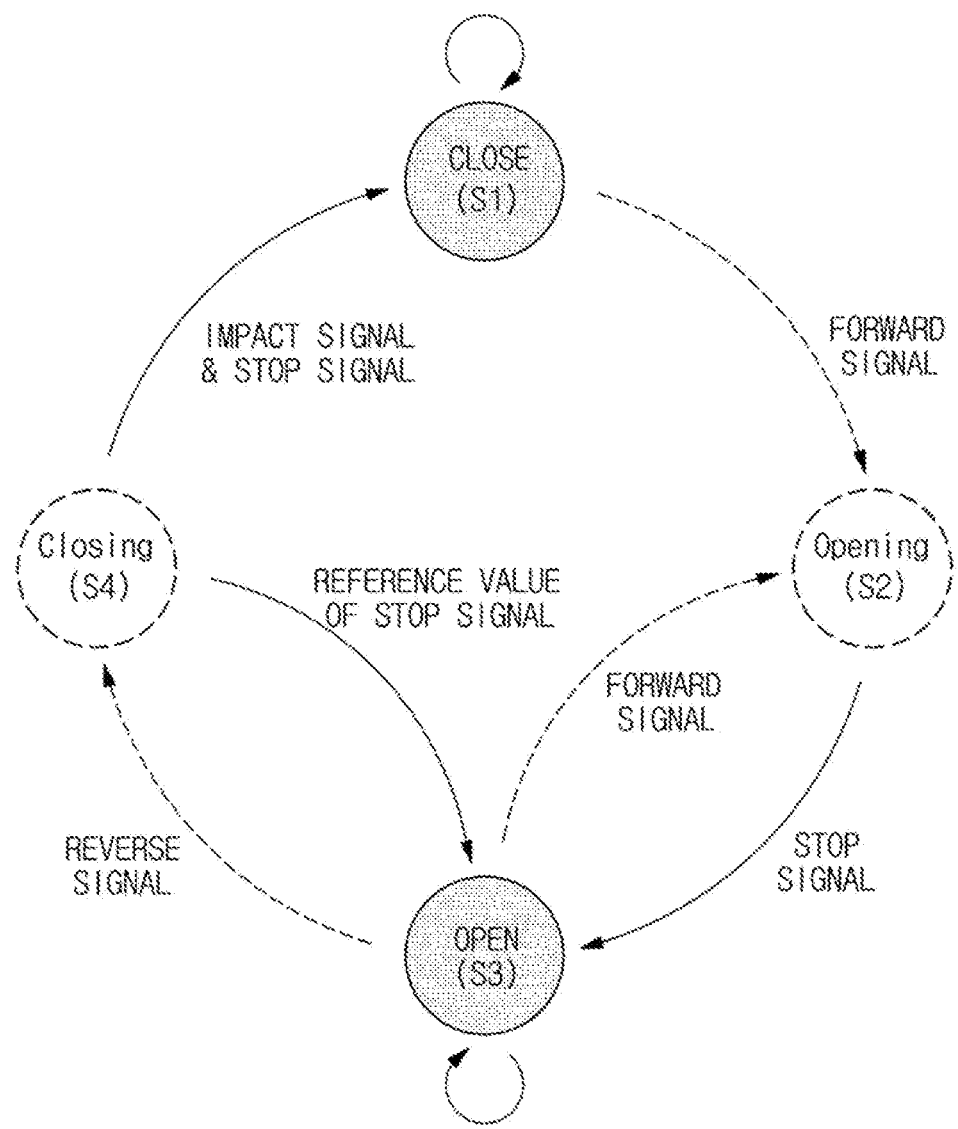

Referring to FIG. 11B, the door state may include the completely closed state (CLOSE) S1, the currently opening state (OPENING) S2, the completely opened state (OPEN) S3, and the currently closing state (CLOSING) S4.

In addition, considering that the door is implemented as the hinged door and only the rotation movement of the gravity directional axis of the door occurs, the drive module 250 may use only the signal of the gravity directional axis (Z axis) from among respective axes' signals generated from the detector when deciding the door state.

If the door is in the completely closed state S1, this means that the door has stopped moving, so that the detector 240 may output the reference value as the Z-axis signal value. In this case, the reference value may be approximately zero.

If the Z-axis signal generated from the detector 240 has the reference value, the drive module 250 may determine that the door remains in the completely closed state.

If the door is released from the completely closed state S1 and starts opening, the detector 240 may output the Z-axis signal corresponding to movement of the door.

The drive module 250 may compare the value of the Z-axis signal generated from the detector 240 with the reference value. If the Z-axis signal value is higher than the reference value, the drive module 250 may determine that the door has moved in the forward direction, i.e., opening direction, on the basis of the Z-axis. In this case, the drive module 250 may determine that the door is in the currently opening state S2.

In this case, the Z-axis signal value may have a positive (+) value higher than a reference value received when the door's hinge rotates in the opening direction. Alternatively, the Z-axis signal value may have a negative(−) value less than a reference value received when the door's hinge rotates in the closing direction.

After the door is in the opening state at a first time point, assuming that the Z-axis signal value received at a second time point which is later than the first time point is higher than a reference value, the drive module 250 may determine that the door is in the continuously opening state S2. If the Z-axis signal value is less than a reference value, the drive module 250 may determine that the door is in the currently closing state S4.

That is, after the drive module 250 determines that the door is in the opening state at the first time point, assuming that the drive module 250 receives the forward directional signal at a second time point which is later than the first time point, the drive module 250 may determine that the door is in the continuously opening state S2. Alternatively, after the drive module 250 determines that the door is in the opening state at the first time point, assuming that the drive module 250 receives the closing directional signal at the second time point which is later than the first time point, the drive module 250 may determine that the door is in the closing state S4.

For example, after the door is opened by a first angle at the first time point, assuming that the door is in the opening state at the second time point, the drive module 250 may determine that the door is opened by a second angle higher than the first angle. Alternatively, assuming that the door is in the opening state at a third time point, the drive module 250 may determine that the door is opened by a third angle higher than the second angle.

In other words, it may be determined that the door is first opened by a first angle, stops moving, is then opened by a second angle, stops moving, and is finally opened by a third angle, such that the door sequentially moves in the range from the first angle to the third angle.

In this case, the first angle, the second angle, or the third angle may indicate a rotation angle of the door on the basis of the hinge.

The door state S3 indicating that the door is in the opening state and then stops moving for a predetermined time or longer, it may mean that the door is completely opened.

After the drive module 250 determines that the door is in the closing state, if the Z-axis signal value is less than a reference value, the drive module 250 may determine the closing directional rotation of the door and thus determine that the door re-enters the closing state S4. If the received signal is determined to be an impact signal, the drive module 250 may determine the completely closed state S1.

After the drive module 250 determines the closing state of the door, the drive module 250 may check the value of the received axis signal. If the axis (Z-axis) signal value is identical to the reference value, the drive module 250 may determine that the door has stopped moving. In this case, the door may be determined to be still opened.

Assuming that the value of each axis signal is higher than the reference value of each axis in the door stop state S3, the drive module 250 may determine that the door has moved in the closing direction. In this case, the drive module 250 may determine that the door is in the closing state S4.

For example, after the door is opened by a first angle at a first time point, assuming that the door is in the closing state at a second time point, the drive module 250 may determine that the door is opened by a second angle which is less than the first angle. In addition, assuming that the door is in the closing state at a third time point, the drive module 250 may determine that the door is opened by a third angle which is less than the second angle.

That is, it may be determined that the door is first opened by the first angle, closed until the door is opened by the second angle, and further closed until the door is opened by the third angle, such that the door sequentially moves in the range from the first angle to the third angle.

Since the door is opened before reaching the completely closed state, the door's angle is gradually reduced in the closing state.

If the drive module 250 receives the opening directional signal while the door is in the closing state, the drive module 250 may determine that the door has restarted opening.

When the door 240 is in contact with the main body 100, the detector 240 may output the impact signal corresponding to impact between the main body 100 and the door 200.

In this case, the impact signal may include a noise signal caused by external force.

Therefore, the drive module 250 may check fluctuations of the received signal, such that the drive module 250 may discriminate between the impact signal caused by the door closing and the noise signal.

That is, the drive module 250 may check a Z-axis signal value on a time axis, and may check the number of fluctuations according to the change of a signal value during a predetermined time. If the number of checked fluctuations is equal to or higher than a reference number of fluctuations, the drive module 250 may determine the presence of the impact signal caused by the door closing. If the number of checked fluctuations is less than the reference number of fluctuations, the drive module 250 may determine the presence of a noise signal.

In this case, the number of fluctuations may be adjusted on the basis of the reference value, such that the number of fluctuations may be equal to or higher than the reference value or may be equal to or less than the reference value.

In this case, the reference number of fluctuations may be obtained by tests and learning.

If the gyro sensor is used as the detector as described above, it may be possible to recognize the opening angle of the door.

Therefore, the drive module may also control image display of the display panel on the basis of the opening angle of the door.

(3) Structure for Detecting the Door's Movement and the Door's State Using the Inductance Sensor The structure for detecting the door's movement and the door's state using the inductance sensor will hereinafter be described with reference to FIGS. 12 and 13.

Figure 12:
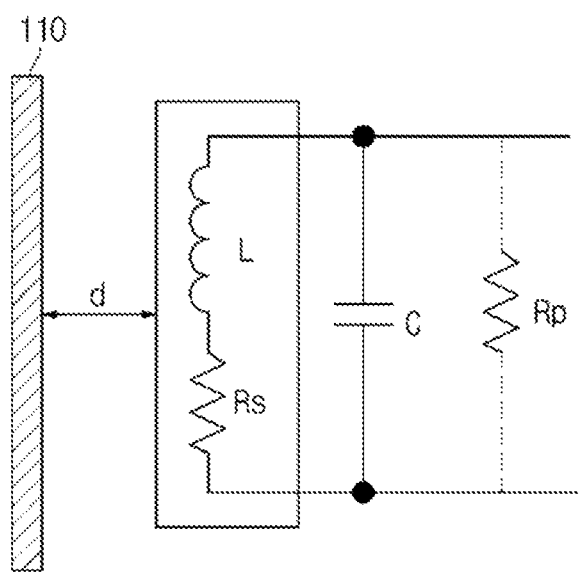
FIG. 12 is a conceptual diagram illustrating an inductance sensor mounted to a door according to an exemplary embodiment.

Referring to FIG. 12, the inductance sensor may include an inductor L, a first resistor (Rs), a capacitor C, and a second resistor (Rp), and may output a signal indicating inductance variation depending upon a difference in the distance between the housing 110 of the main body and the inductance sensor.

If a current flows into the inductor L of the inductance sensor, a magnetic field occurs in the vicinity of the inductance sensor. As the distance between the inductance sensor and the housing of the main body located in the vicinity of the magnetic field decreases, variation in the magnetic field increases.

That is, the inductance sensor may measure variation of the magnetic field, and may output the measured value, such that the distance between the main body and the inductance sensor can be recognized.

In the exemplary embodiment, it is assumed that the door is opened or closed according to the hinged door scheme.

It is also assumed that the initial state of the door is the completely closed state.

Figure 13:
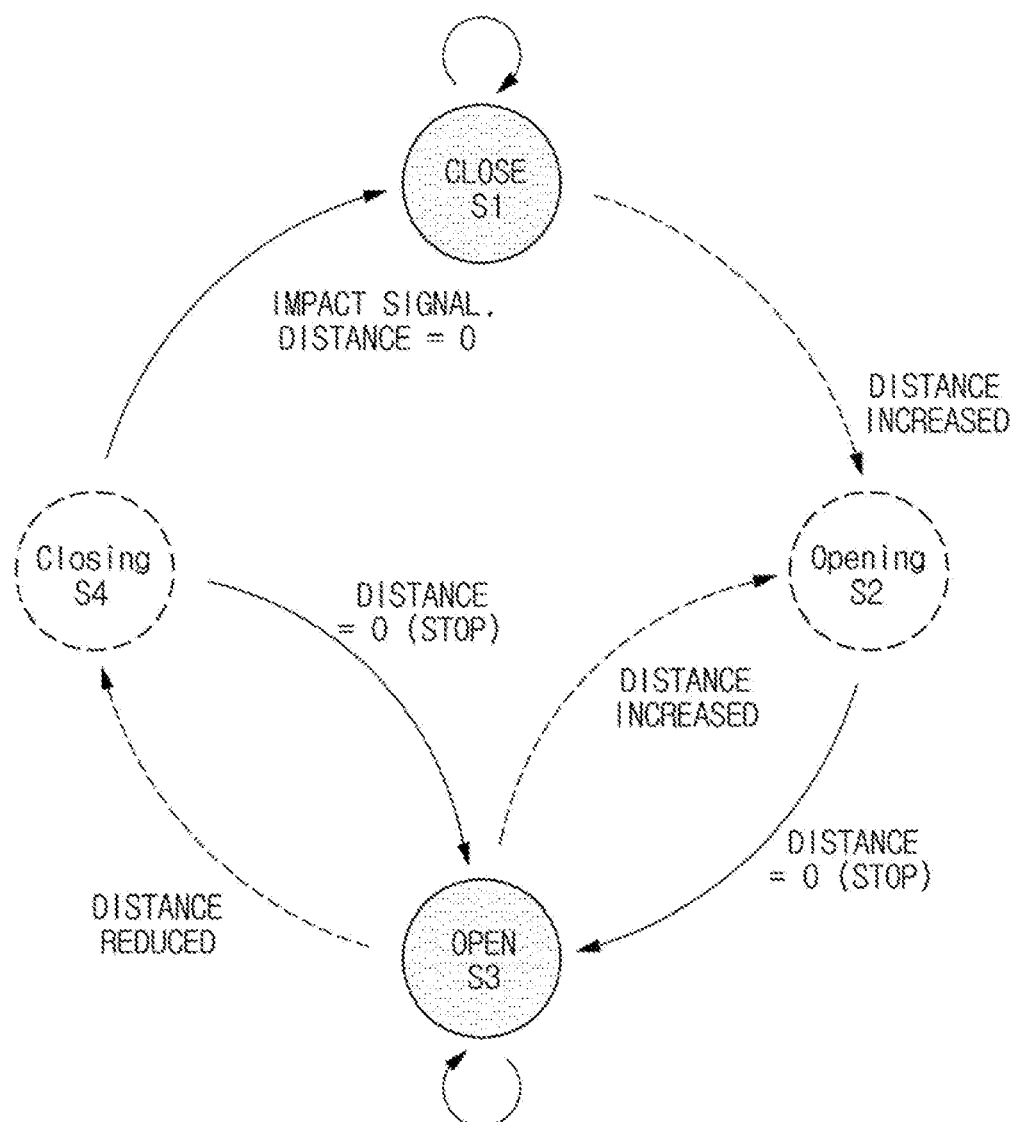
FIG. 13 is a conceptual diagram illustrating output signals of an inductance sensor according to an exemplary embodiment.

Referring to FIG. 13, the door state may include the completely closed state (CLOSE) S1, the currently opening state (OPENING) S2, the completely opened state (OPEN) S3, and the currently closing state (CLOSING) S4.

If the door is in the completely closed state S1, this means that the door is in contact with the main body, such that the detector 240 may output a reference value as a signal value indicating change of inductance. In this case, the reference value may be a predetermined value.

If the value of the output signal of the detector 240 is identical to the reference value, the drive module 250 may determine that the door remains in the completely closed state.

If the door is released from the completely closed state S1 and starts opening, the detector 240 may output the signal indicating change of inductance.

The drive module 250 may determine the distance to the main body on the basis of the value of the output signal of the detector 240. If the determined distance becomes longer, the drive module 250 may determine that the door is in the currently opening state S2.

After the door is in the currently opening state at a first time point, the drive module 250 may detect the value of the signal received at a second time point which is later than the first time point, and may check the distance corresponding to the signal value of the second time point. If the checked distance is longer than the distance checked at the first time point, the drive module 250 may determine that the door is in the continuously opening state S2.

After the drive module 250 determines that the door is in the opening state at the first time point, assuming that the distance corresponding to the value of the signal received at the second time point is denoted by zero "0", the drive module 250 may determine that the door is opened and then stops moving for a predetermined time or longer such that it determines the completely opened state S3.

Assuming that the door is in the opening state and then stops opening for a predetermined time or longer, this door state may include the completely opened state S3.

After the drive module 250 determines that the door is in the opening state at a first time point, assuming that the distance corresponding to the value of the signal received at a second time point is reduced, the drive module 250 may determine that the door is in the closing state S4.

After the drive module 250 determines that the door is in the closing state, the drive module 250 checks the distance corresponding to the value of the received signal. If the checked distance is zero "0", the drive module 250 may determine that the door remains in the open state. If the checked distance is reduced, the drive module 250 may determine that the door is in the continuously closing state S3. If the received signal is the impact signal during the closing state of the door, the drive module 250 may determine the completely closed state S1.

When the door 200 contacts the main body 100, the detector 240 may output the impact signal corresponding to impact between the main body 100 and the door 200.

In this case, the impact signal may include a noise signal caused by external force.

Therefore, the drive module 250 may check fluctuations of the received signal to discriminate between the impact signal caused by the door closing and the noise signal.

That is, the drive module 250 may check the value of an inductance signal on a time axis, and may check the number of fluctuations according to the change of a signal value for a predetermined time. If the checked number of fluctuations is equal to or higher than the reference number of fluctuations, the drive module 250 may determine the occurrence of the impact signal caused by the door closing. If the checked number of fluctuations is less than the reference number of fluctuations, the drive module 250 may determine the occurrence of the noise signal caused by external force.

In this case, the number of fluctuations may be adjusted on the basis of the reference value, such that the number of fluctuations may be equal to or higher than the reference value or may be equal to or less than the reference value.

The reference number of fluctuations may be a predetermined number of times obtained by tests and learning.

The display panel 220 may change images on the basis of a command of the drive module, and may display the changed images. A detailed description thereof will hereinafter be described with reference to FIGS. 14 to 16.

Figure 14:
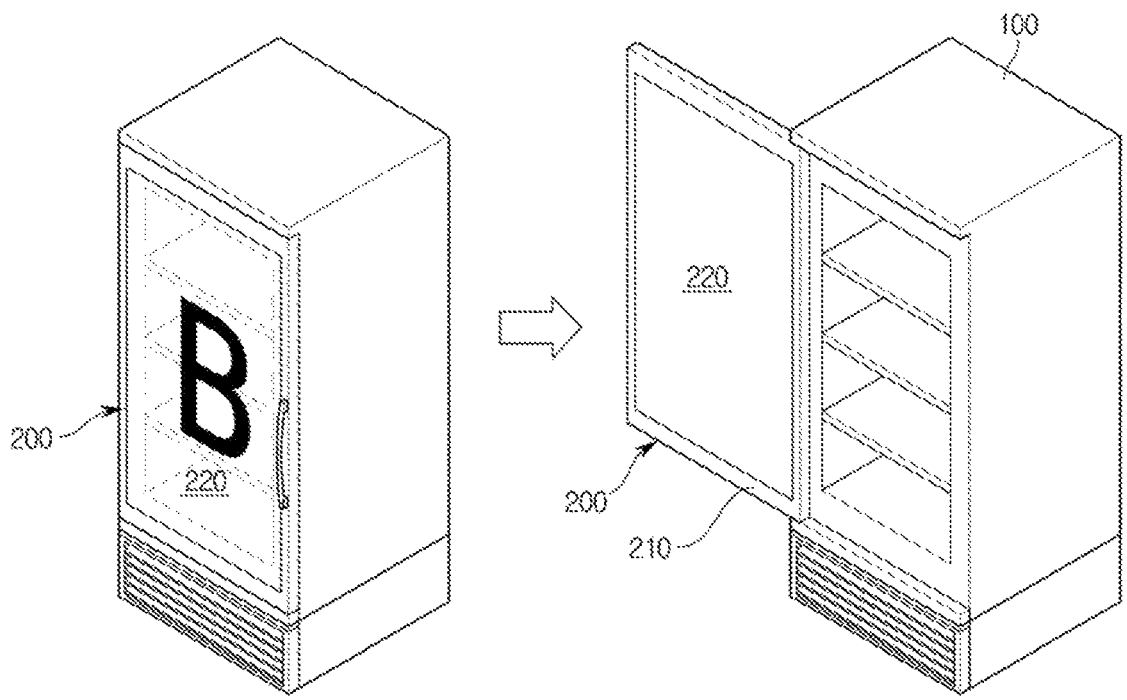
FIGS. 14 to 20 are conceptual diagrams illustrating exemplary images displayed on a display panel of a door according to an exemplary embodiment.

Referring to FIG. 14, assuming that the door is in the completely closed state, the display panel 200 may display images regarding product information, or may display predetermined advertisement images or the like.

Assuming that the door is in the opening state, the display panel turns off the backlight unit and no images are displayed.

Assuming that the door is in the completely closed state, the display panel 200 may display images regarding product information, or may display predetermined advertisement images or the like.

Figure 15:
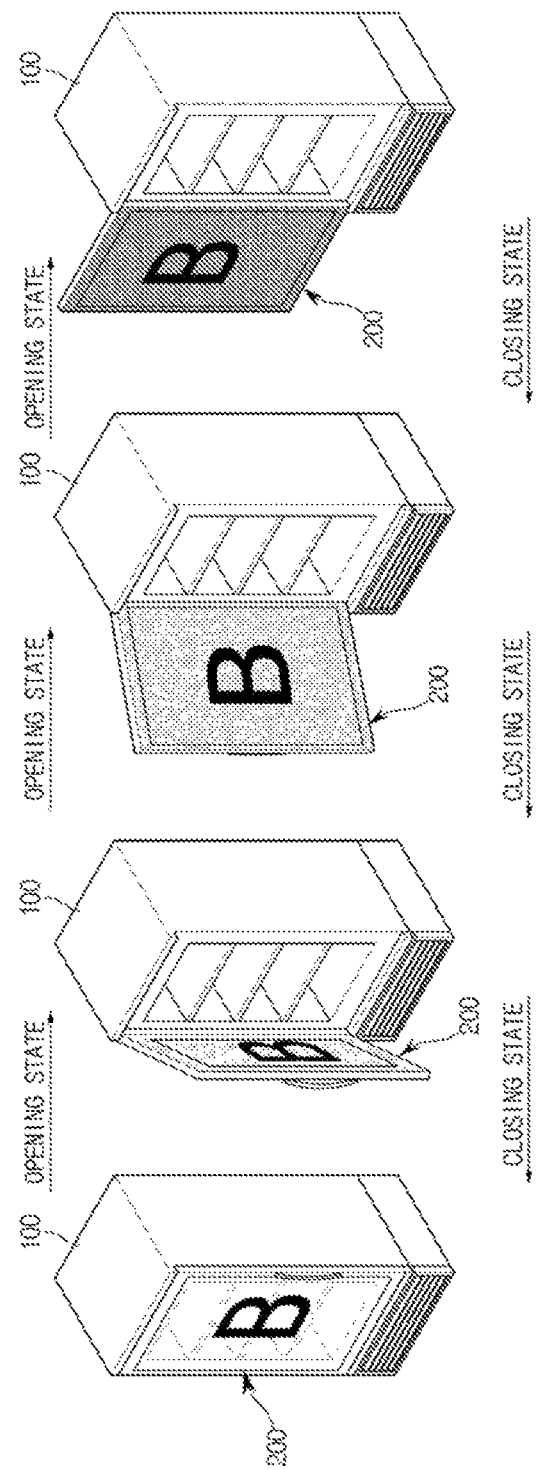

Referring to FIG. 15, assuming that the door is being opened and continues the opening state, the display panel may gradually reduce brightness of the backlight unit. Assuming that the door is being closed and continues the closing state, the display may gradually increase brightness of the backlight unit.

Figure 16:
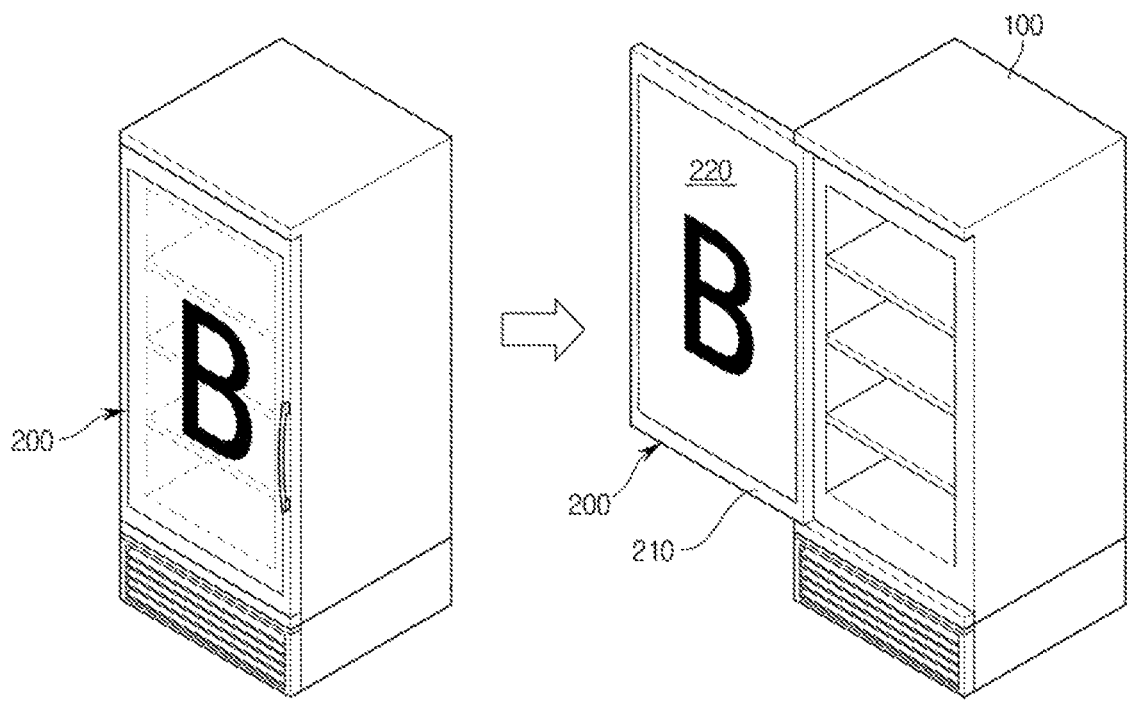

Referring to FIG. 16, assuming that the door is in the completely closed state, the display panel 220 may display images regarding product information, or may display predetermined advertisement images or the like.

If the door is in the opening state, the display panel may perform both-side inversion (horizontal mirroring) of the displayed images to display the inverted (mirror) image thereon, such that the user can easily recognize letters even when the door is opened. Thereafter, assuming that the door is in the completely closed state, the display panel may re-invert the displayed images, and may thus display the re-inverted images thereon.

Figure 17:
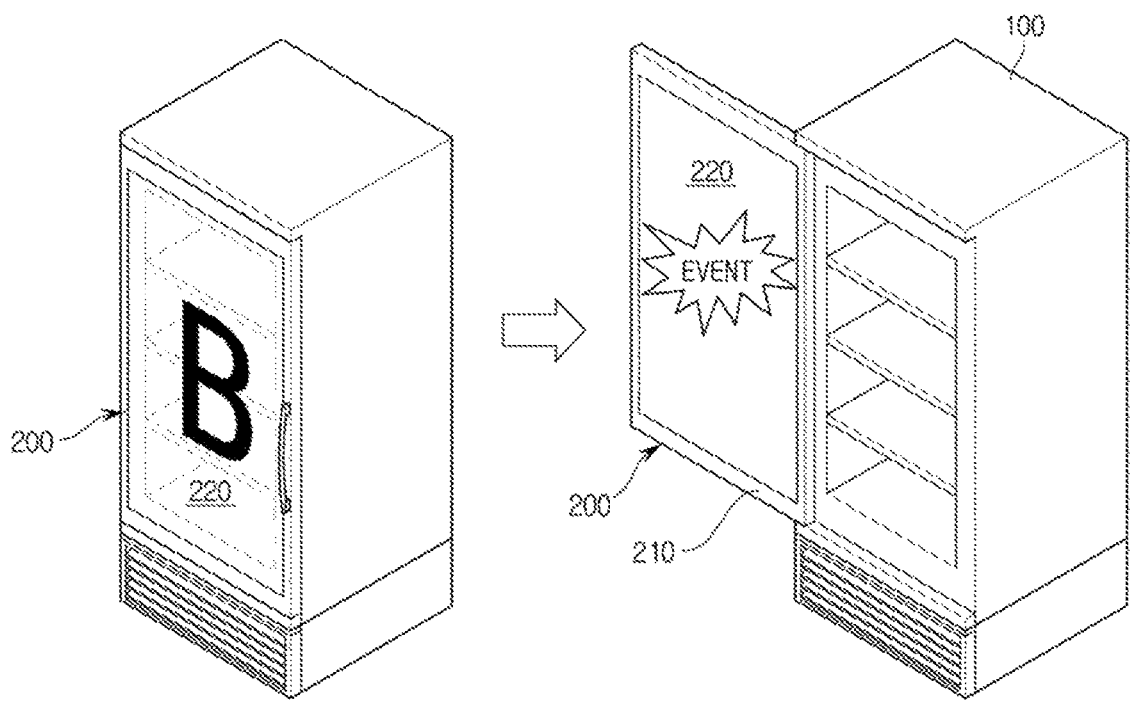

Referring to FIG. 17, assuming that the door is in the completely closed state, the display panel 220 may display images regarding product information.

Assuming that the door is in the opening state, the display panel 220 may display event images, advertisement images, pop-up images, etc.

If the door is in the completely closed state, the display panel may re-display images regarding product information.

Figure 18:
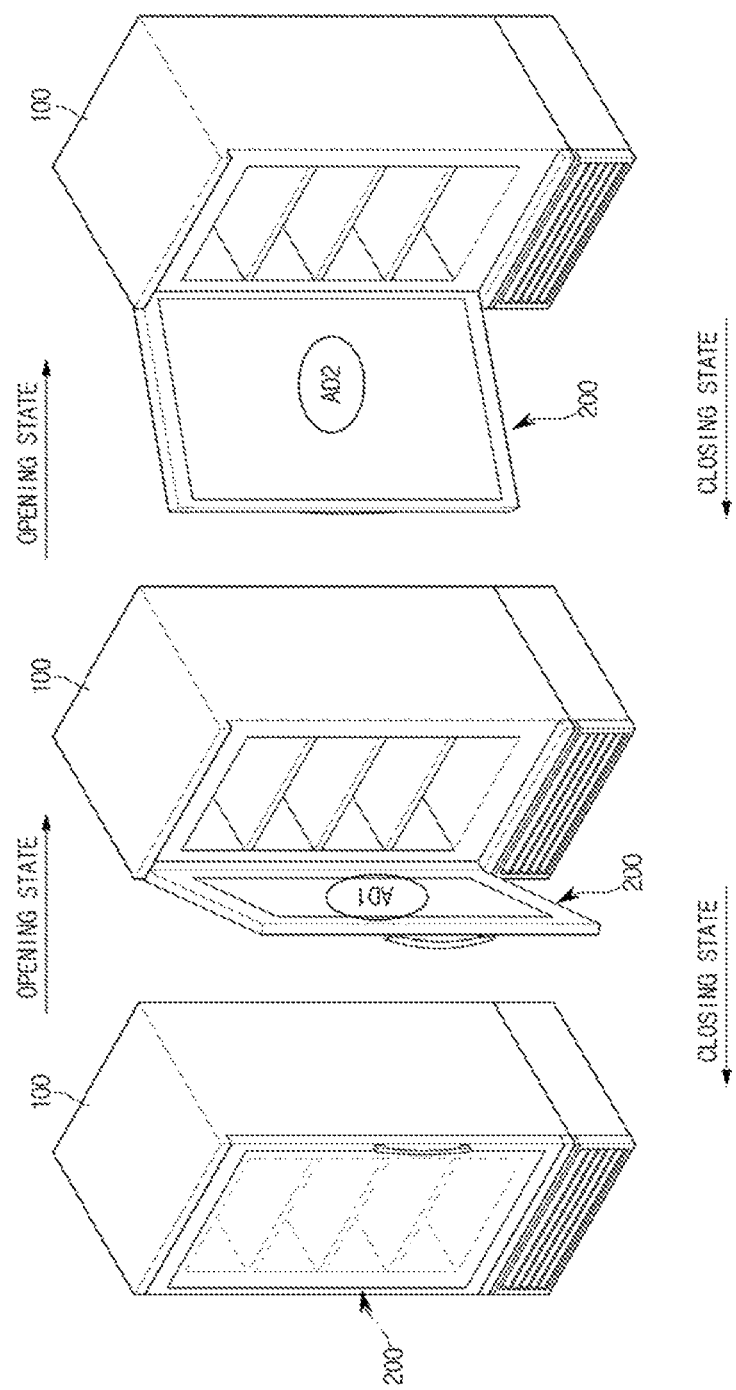

Referring to FIG. 18, assuming that the door is released from the completely closed state and starts opening, the display panel 220 may delete product information images which were displayed in the completely closed state of the door, and may display event images, coupon images, or advertisement images. If the door is opened once and re-enters the opening state, the display panel 220 may display other event images, other coupon images, or other advertisement images.

For example, assuming that the door is in the first opening state while the display panel 220 displays images regarding milk information in the door's close state, the display panel 220 may display advertisement images for a carbonated beverage. Thereafter, assuming that the door is in the second opening state, the display panel 220 may display advertisement images for the fruit juice.

In this case, the product information images may include various kinds of information, for example, an open date (or packaging date) for each product, the expiration date, nutrients, the country of origin, etc.

If the door is released from the opening state and enters the closing state, the display panel 220 may change images obtained from the opening state to images (e.g., images regarding product information) obtained from the completely closed state, and may then display the images regarding the completely closed state.

Figure 19:
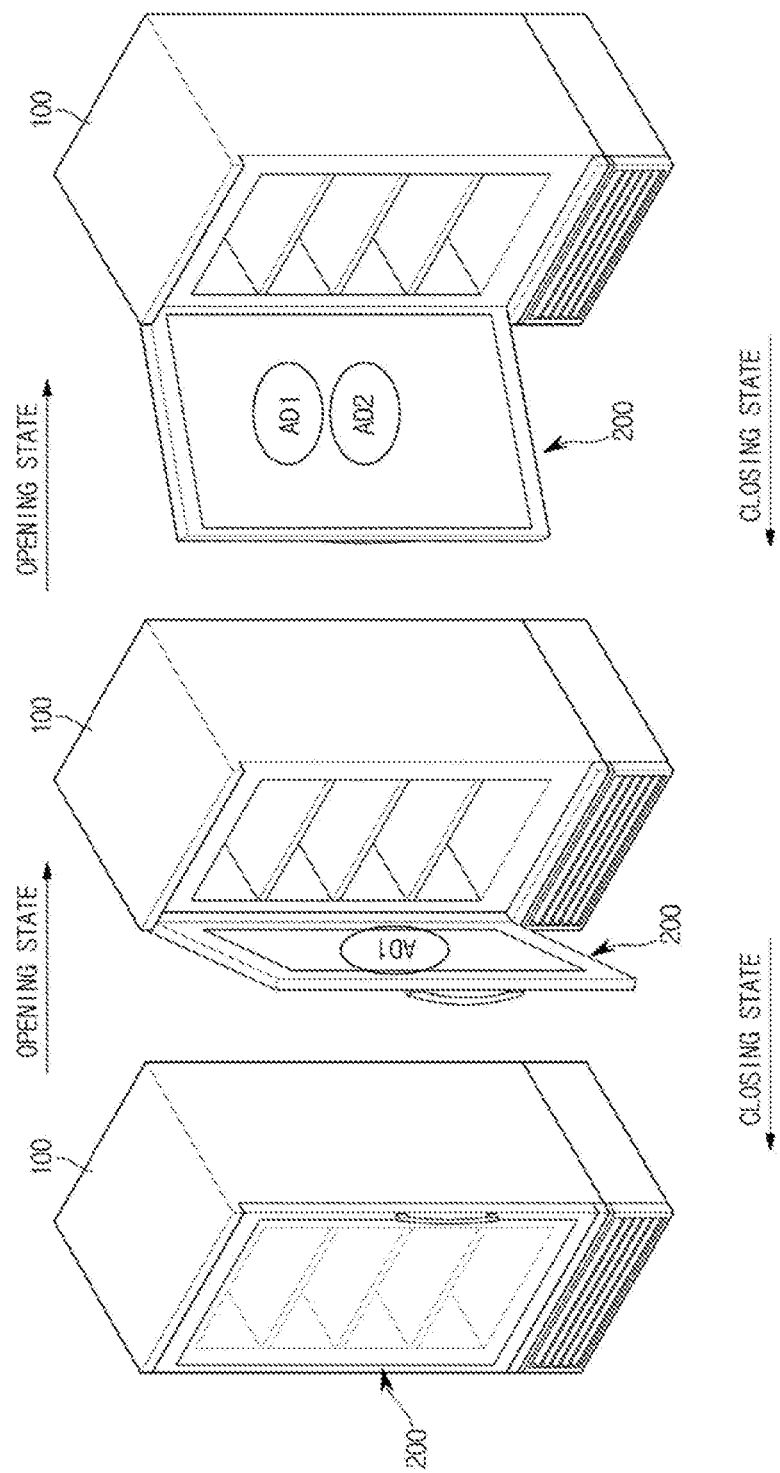

Referring to FIG. 19, if the door starts opening while the display panel 220 remains transparent in the completely closed state of the door, the display panel 220 may display a pop-up window regarding the first advertisement. If the door continues the opening state, the display panel 220 may also display another pop-up window regarding the second advertisement.

In addition, the pop-up window of the first advertisement may be displayed on a first position of the display panel 220, and the pop-up window of the second advertisement may also be displayed on a second position of the display panel 220.

That is, the display panel 220 may display the pop-up windows of the first advertisement and the pop-up window of the second advertisement at different positions.

Figure 20:
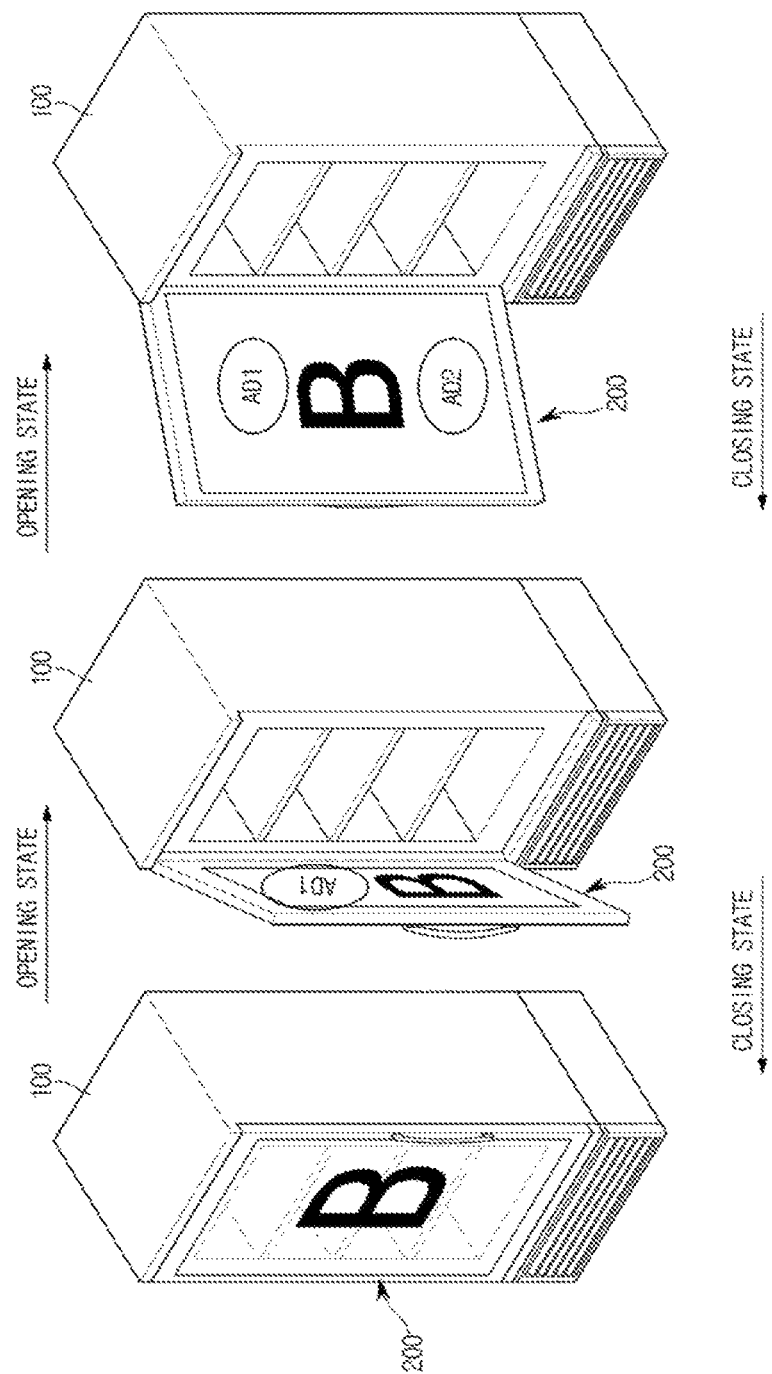

Referring to FIG. 20, the display panel 220 may display images regarding product information in the completely closed state. If the door is in the opening state, a pop-up image regarding the first advertisement may overlap the product information image on the display panel 220.

If the door continues the opening state, a pop-up window regarding the second advertisement may also overlap the product information images on the display panel 220. The display panel 220 may display the pop-up window regarding the first advertisement at the first position, and may also display the pop-up window regarding the second advertisement at the second position.

In addition, assuming that the door continues the opening state, the display panel 220 may delete the pop-up window regarding the first advertisement.

If the door continues the opening state, the display panel 220 may delete the pop-up window regarding the first advertisement, and may display the pop-up window regarding the second advertisement at the second position.

In addition, when the door is in the opening state, the display panel 220 may check the number of the opening states, which indicates how many times the door had the opening state. If the checked number is identical to a predetermined number of times, it may be determined that the inside of the door is facing the user and the displayed images may also be inverted.

For example, assuming that the predetermined number is set to 3, the display panel may perform horizontal mirroring of the displayed image and then display the inverted image. Thereafter, if it is determined that the door is in the closing state, the image is re-inverted back to the original image such that the original image is displayed on the display panel.

If the image displayed on the display panel is inverted and the door changes from the opening state to the closing state, the counted number of the opening states is reduced by one. Thereafter, if the door resumes the opening state, the number of the opening states may increase by one.

Figure 21:
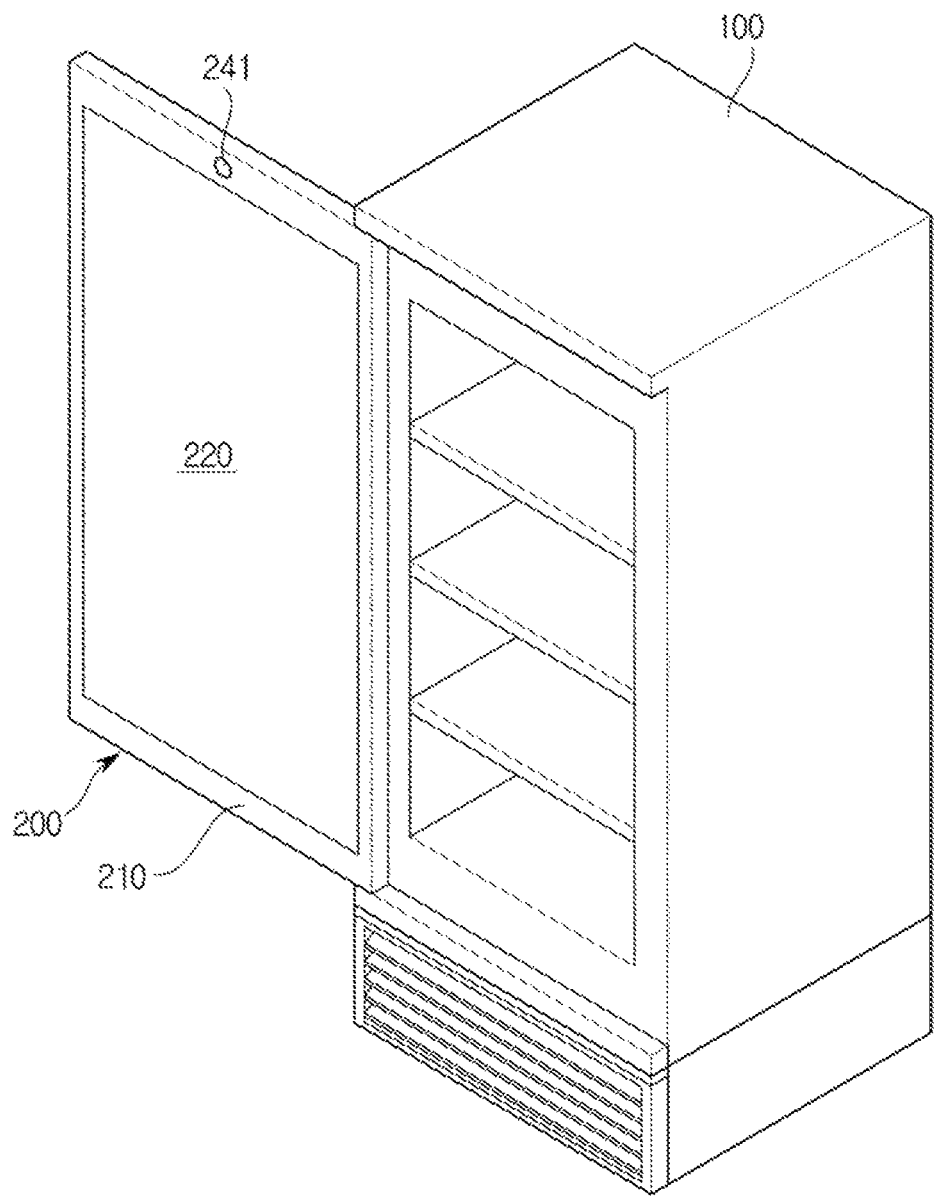
FIG. 21 is a conceptual diagram illustrating a refrigerator including a door according to another embodiment.

FIG. 21 is a conceptual diagram illustrating a refrigerator including a door according to another exemplary embodiment The display panel 220 may display information images or warning images for reducing power consumption when the door is opened for a reference time or longer.

Figure 22:
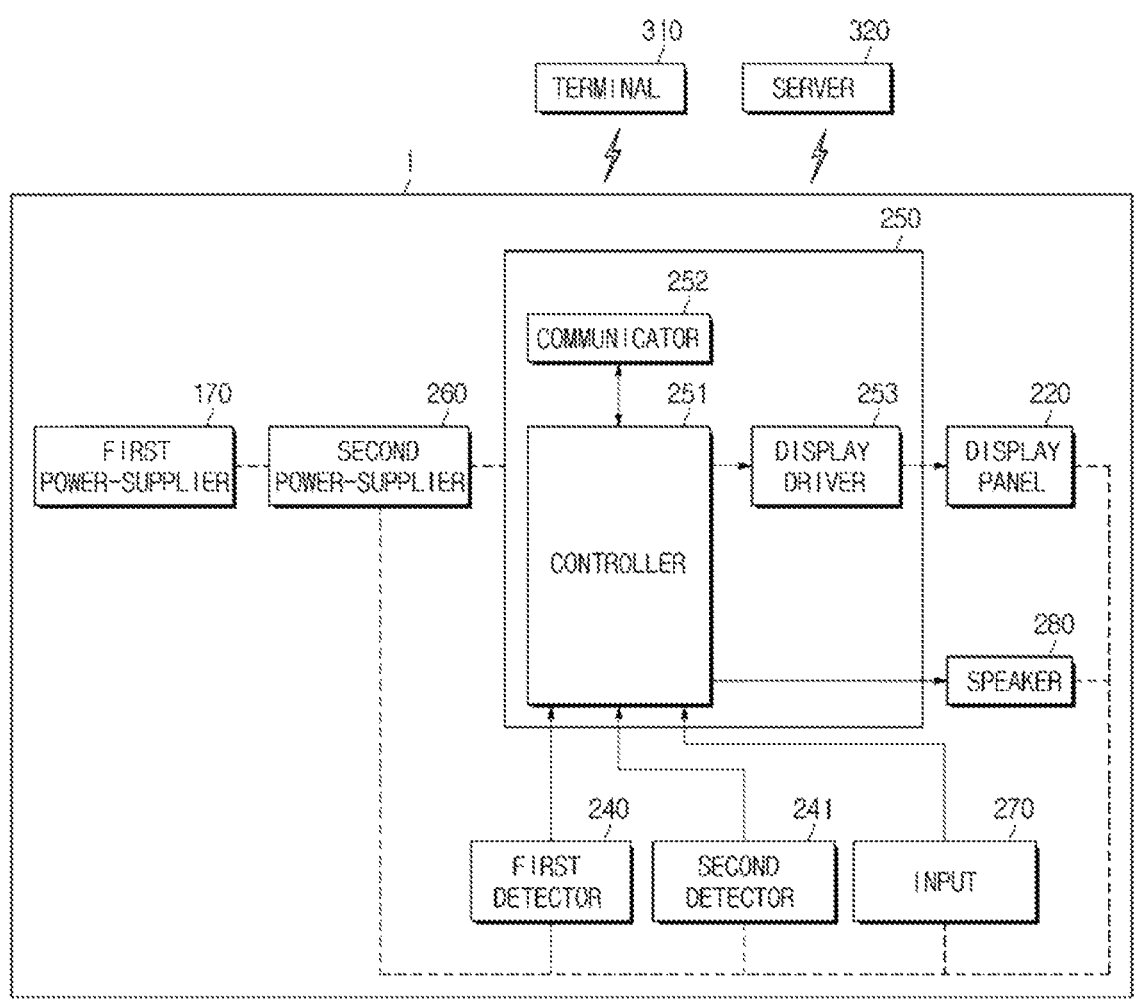
FIG. 22 is a block diagram illustrating a refrigerator including a door according to another embodiment.

FIG. 22 is a block diagram illustrating a refrigerator including the door according to another exemplary embodiment.

The door may be mounted to the refrigerator 1. For convenience of description and better understanding of the present disclosure, the door is assumed to be mounted to the showcase of the refrigerator.

Referring back to FIG. 21, the refrigerator 1 may include a main body 100 which forms the external appearance and has the opening, and a door 200 rotatably mounted to the main body 100 to open or close the opening of the main body 100.

The structure of the main body 100 may be similar to other exemplary embodiments described above, so a detailed description thereof will herein be omitted here.

The door 200 acting as a hinged door may be rotatably mounted to the opening of the front surface of the main body 100, may be mounted to the opening corresponding to the region of the storage chamber 120 in a manner that the storage chamber 120 can be shielded from the outside to prevent cool air from escaping.

The door 200 may include a frame 210 to form the border, a display panel 220 disposed in the frame 210 and disposed in the internal region of the frame 210, and a handle member 230 disposed in the frame 210 and grasped by the user, as shown in FIG. 1.

The frame of the door, the display panel, and the handle member may be similar to those of other exemplary embodiments described above, so a detailed description thereof will be omitted here.

The door may further include a first detector 240 mounted to the handle member 230 to detect movement of the door 200 according to position change of the door; and a second detector 242 mounted to the internal frame to scan the region of the storage chamber.

The first detector 240 may also be mounted to the frame 210 instead of the handle member 230 of the door.

In this case, the door's movement may be generated in response to the opening or closing of the storage chamber 120.

The first detector 240 may include, but is not limited to, an acceleration sensor, a gyro sensor, an inductance sensor, and/or a geomagnetic sensor.

The second detector 240 may include, but is not limited to, an infrared sensor and/or an image sensor.

The door 200 may further include a drive module 250 disposed in space between the frame 220 and the packing 240 to control driving of the display panel 220.

That is, the drive module 250 may be protected from external impact by the frame 210 and the packing 240.

Referring to FIG. 22, the refrigerator 1 may include a first power-supplier 170, a first detector 240, a second detector 241, a drive module 250, a second power-supplier 260, and an input 270. The refrigerator 1 may include the display panel 220 driven by a control signal of the drive module 250, and may also include a speaker 280.

In this case, the first power-supplier 170, the first detector 240, the second power-supplier 260, the input 270, the display panel 220, and the speaker 280 according to another exemplary embodiment may be similar to those of one or more of the above-described exemplary embodiments, so a detailed description thereof will be omitted here.

The drive module 250 may be comprised of at least one printed circuit board (PCB).

The drive module 250 may include a controller 251, a communicator 252, and a display driver 253.

The controller 251 may be implemented using a processor, a central processor (CPU), a micro-processor (MCU), etc.

Upon receiving the output signal of the first detector 240, the controller 251 may perform signal processing of the received signal, may check the signal processed value, and may determine the movement state of the door on the basis of the checked value.

Upon receiving the output signal of the second detector 241, the controller 251 may perform signal processing of the received signal, and may check an empty space from among plural spaces of the storage chamber on the basis of the signal processed signal.

In addition, the controller 251 may also check information on products stored in the storage chamber on the basis of scan information.

The drive module may further include a storage configured to store information regarding products stored in the storage chamber 120.

The controller 251 may include a reference value, a movement direction, and the reference number of fluctuations needed to decide the movement state of the door.

The controller 251 may determine the completely opened state, the completely closed state, the currently opening state, and the currently closing state of the door on the basis of the movement direction of the door. If the door is in the currently opening state or the currently closing state, images displayed on the display may be changed.

In this case, changing the images displayed on the display panel 220 may include inverting images obtained from the door closed state when the door moves from the completely closed state to the currently opening state, and then displaying the inverted images.

Changing the images displayed on the display panel 220 may include re-inverting images obtained from the door's opening state when the door moves from the currently opening state to the currently closing state, and then displaying the resultant re-inverted images.

Changing the images displayed on the display panel 220 may include deleting images regarding product information obtained from the completely closed state of the door when the door moves from the completely closed state to the currently opening state; and displaying event images, coupon images, or advertisement images.

In this case, the product information images may include various kinds of information, for example, an open date (or packaging date) for each product, the expiration date, nutrients, and the country of origin.

Changing images displayed on the display panel 220 may include, if the door moves from the currently opening state to the currently closing state, changing images obtained from the currently opening state to images (e.g., images regarding product information) obtained from the completely closed state, and then displaying the changed images.

The controller 251 may gradually reduce brightness of the backlight unit mounted to the display panel 220 on the basis of the movement state of the door or may turn off the backlight unit on the basis of the movement state of the door.

The controller 251 may also change a transparent state of the display panel 220 on the basis of the movement state of the door.

In addition, if the door is in the opening state or in the closing state, the controller 251 may display information regarding the empty region of the storage chamber on the display panel.

When the door is closed, the controller 251 may control the display panel such that images of the empty region contained in the storage chamber are displayed as opaque images on the display panel. Alternatively, when the door is closed, the controller 251 may control the display panel such that images of the region including products therein are displayed as opaque images on the display panel.

In addition, the controller 251 may also display information regarding the empty region and information regarding out-of-stock products when the door is in the completely closed state, such that the user can recognize information regarding the empty region contained in the storage chamber when the door is in the closed state.

The controller 251 may transmit information regarding the empty region to the terminal or the server, may transmit information regarding products not stored in the storage chamber to the terminal or the server, may request a specific time at which goods are stocked from the terminal 310 or the server 320, and may control the restocking time of the received products to be displayed on the display panel.

Figure 23:
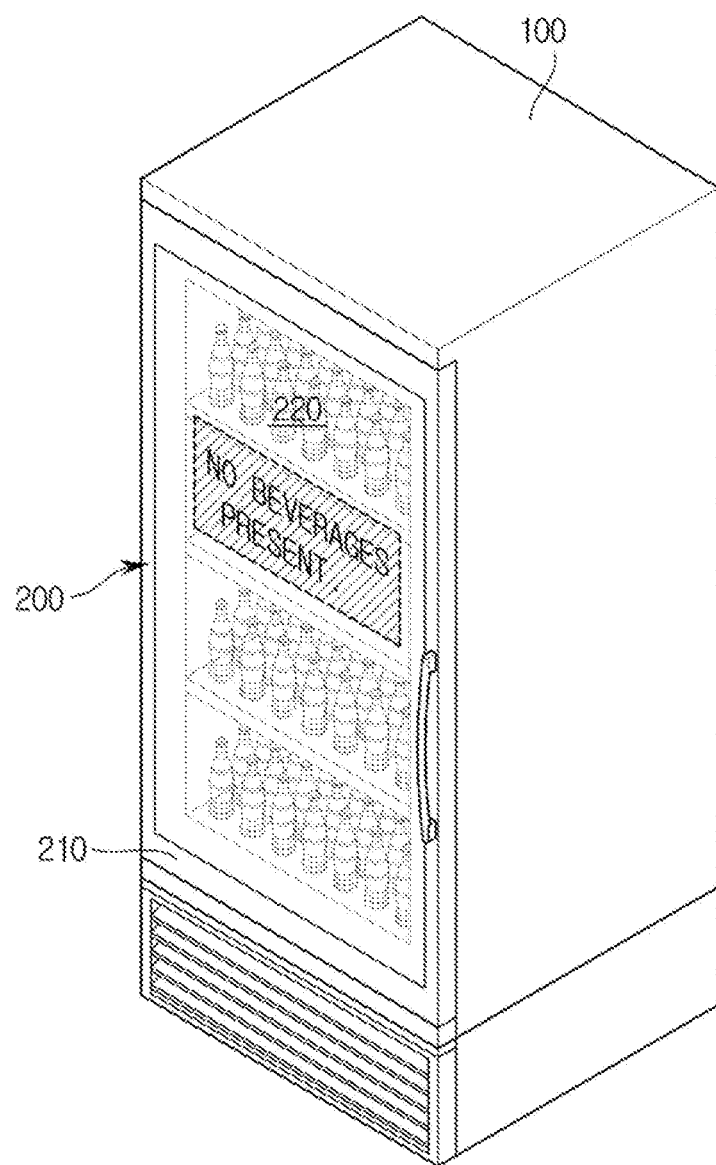
FIGS. 23 and 24 are conceptual diagrams illustrating a display panel including a door according to another embodiment.

Referring to FIG. 23, when the door is in the completely closed state, the display panel may display information regarding a specific position at which no products are stored in the storage chamber and information regarding the empty region, and may display the remaining regions as a transparent image.

In addition, the display panel 220 may also display information regarding products not stocked in the storage chamber.

In this case, the information regarding out-of-stock products may include a product name, a product photo image, nutritional information of the product, a manufacturing company of the product, and a time point at which the product is stocked.

Figure 24:
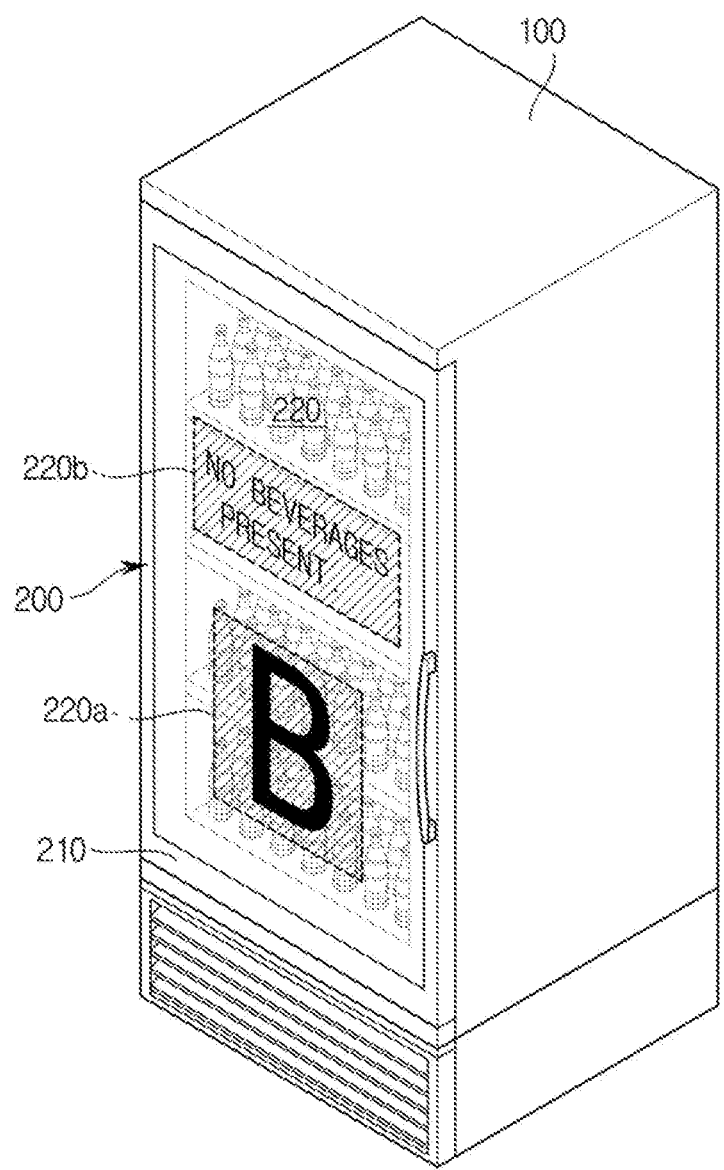

Referring to FIG. 24, the display panel may include a plurality of regions, and may display different images according to individual regions.

That is, the display panel 220 may display different images not only in a first region 220a corresponding to the product stocked position from among the internal regions of the storage chamber, but also in a second region 220b corresponding to a position having no products.

For example, the display panel may display images regarding product information in the first region 220a, and may display information regarding out-of-stock products in the second region 220b.

The communicator 252 may transmit information regarding the empty region to the terminal or the server, may also transmit request information indicating the product stocked time, and may transmit information regarding the stocked time of the received product to the controller 251.

Figure 25:
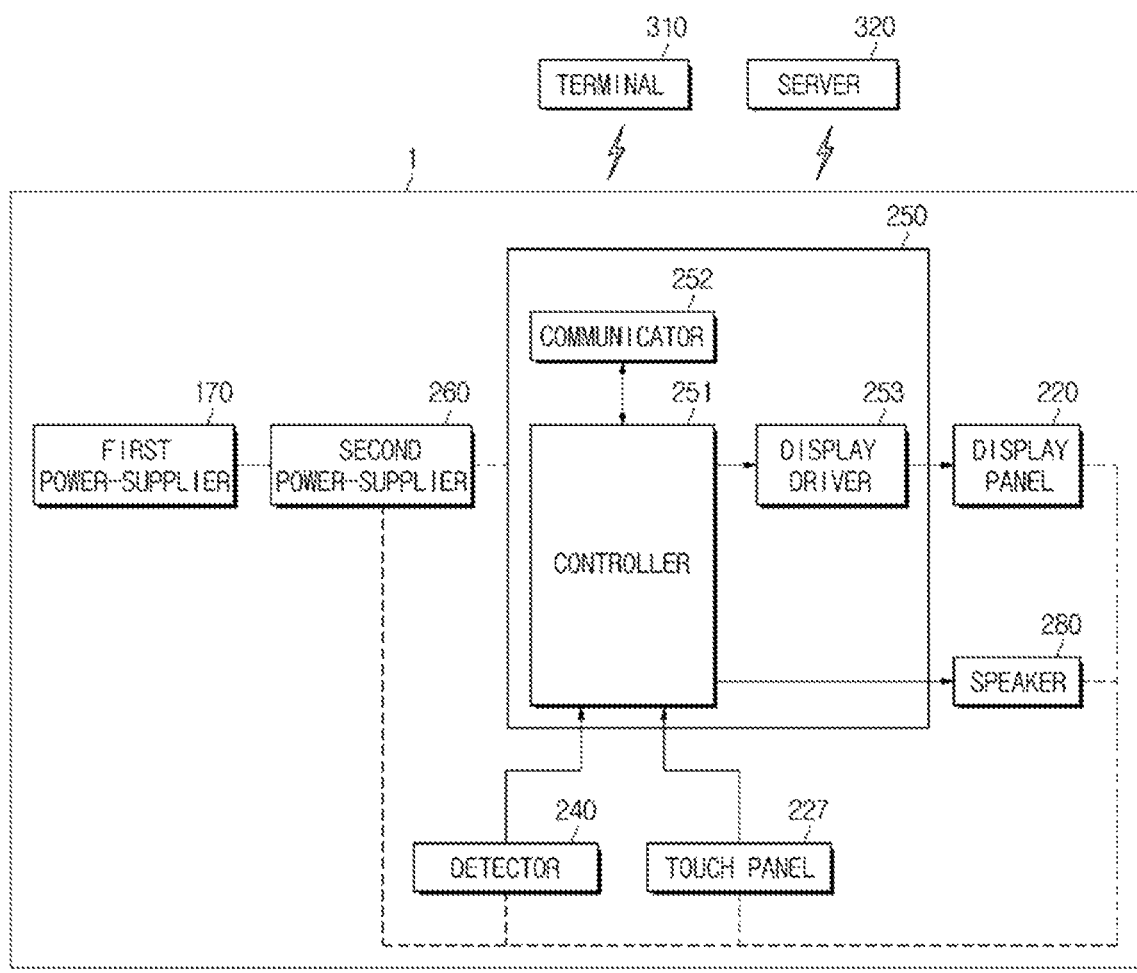
FIG. 25 is a block diagram illustrating a refrigerator including a door according to another embodiment.

FIG. 25 is a block diagram illustrating a refrigerator according to another exemplary embodiment.

Referring to FIG. 25, the door according to another embodiment may further include a touch panel 227 located adjacent to the display panel.

The door according to another embodiment may be mounted to the refrigerator. For example, the door may be mounted to the showcase of the refrigerator for convenience of description and better understanding of the present disclosure.

The refrigerator 1 including the door of another embodiment may include a first power-supplier 170, a detector 240, a drive module 250, a second power-supplier 260, and a touch panel 227. The refrigerator 1 may include a display panel 220 driven by a control signal of the drive module 250, and may further include a speaker 280.

In this case, the first power-supplier 180, the detector 240, the second power-supplier 260, the display panel 220, and the speaker 280 according to another embodiment are identical in structure to the first power-supplier 170, the detector 240, the second power-supplier 260, the display panel 220, and the speaker 280 according to one embodiment, and as such a detailed description thereof will herein be omitted for convenience of description.

The touch panel 227 may output a signal generated from the touched position.

The touch panel 227 may output a signal related to multiple touching. Upon receiving the output signal of the detector 240, the controller 251 may perform signal processing of the received signal, may check the value of the signal processed signal, may determine the movement state of the door on the basis of the checked value, and may change images displayed on the display panel on the basis of the movement state (i.e., the opening or closing state) of the door. The above-mentioned constituent elements may be similar to those of one or more exemplary embodiments described above, so a detailed description thereof will herein be omitted.

The controller 251 may control driving of the display driver 253 on the basis of the position of a touch point of the touch panel 227.

In more detail, upon receiving position information regarding the touch point, the controller 251 may check information on the currently displayed image, may check the button existing at the touch point from among a plurality of buttons contained in the checked image, may control display of sub-images corresponding to the checked button, and may control execution of functions corresponding to the checked button.

For example, when the advertisement image having a detailed-view button and a mode change button is displayed on the display panel 220, assuming that the position of the touch point touched by a consumer corresponds to the detailed-view button, display of image information corresponding to the detailed-view button is controlled.

In this case, the display panel 220 may display images regarding information on the advertisement target along with the currently displayed advertisement images, or may convert the currently displayed images into images regarding information on the advertisement target and display the converted images thereon.

In this case, information regarding the advertisement target may include the price of the advertisement target, the position of a store selling the advertisement target, discount information of the advertisement target, information regarding the country of origin, etc.

The controller 251 may basically display menu buttons, a mode change button, and an update button, etc. irrespective of categories of images displayed on the display panel 220.

In addition, the controller 251 may control the menu buttons, the mode change button, the update button, etc. not to be displayed on the display panel 220. If the user touches a certain position of the display panel 220, the menu buttons, the mode change button, the update button, etc. may also be displayed on the display panel 220.

The drive module may further include a storage. The storage stores the position of various buttons for each image, stores position information of the menu buttons, the mode change button, the update button, the event information button, the discount coupon button, the information map button, etc., and stores sub-images of respective buttons.

As is apparent from the above description, since a detector is mounted only to the display device and the door, production costs of the display device and the door can be reduced, the production process can be simplified, and not only the opening or closing of the door (i.e., the state of 1 or 0), but also the opening/closing ongoing states can be recognized, such that image display scenarios can be diversified in various ways.

In addition, advertisement images are displayed on the transparent display device, production costs and management costs of advertisement leaflets can be greatly reduced, and advertisement images are displayed in various ways, such that the advertisement effects can be maximized and business image of the corresponding enterprise can be improved.

If the display device is implemented as an electric refrigerated showcase, a display panel of the door is formed of a transparent display panel, such that the user can simultaneously view internal articles and images of the refrigerated showcase, resulting in improved aesthetics of the display device.

If the display device is implemented as the refrigerated showcase, images displayed on the display panel corresponding to the door are inverted according to the opening state of the door, the user can correctly view images displayed on the door anywhere, resulting in higher recognition of images.

If the display device is implemented as the door of the refrigerated showcase, dimming of the backlight unit of the display panel acting as the door may be controlled or turned on/off according to the door opening angle, resulting in reduction of power consumption.

If the display device is implemented as the refrigerated showcase, information indicating insufficiency of articles contained in the storage chamber is displayed on the display device, such that the showcase can be easily managed.

In addition, if the display device is implemented as the refrigerated showcase, the display panel of the door is formed of a transparent display panel so that article information is displayed on the transparent display device. As a result, the user need not take articles out of the showcase to visually recognize information on the articles, resulting in greater user convenience. In addition, the number of opening/closing times of the door can be greatly reduced, cool air leakage caused by the opening of the door can be prevented, such that the cooling effect can be increased and power consumption caused by the cooling cycle can be reduced.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A display device comprising:
a frame configured to be rotatably mountable to a base object;
a display panel mounted to the frame;
a detector disposed in the frame, and configured to detect a movement of the frame and output a signal corresponding to the movement; and
a controller configured to:
identify a movement state of the frame based on the signal output by the detector, and
control the display panel to display different images based on the identified movement state of the frame,
wherein the movement state of the frame includes a completely opened state, a completely closed state, and an ongoing state indicating that the frame is between the completely opened state and the completely closed state, and
wherein, based on the movement state of the frame being the completely closed state, the controller is further configured to identify whether the signal output by the detector is an impact signal caused by closure of the frame or a noise signal caused by external force.

2. The display device according to claim 1,
wherein the detector is further configured to detect whether the frame is moving away from the base object or moving closer to the base object,
wherein the detector comprises at least one of an acceleration sensor, a gyro sensor, and a geomagnetic sensor.

3. The display device according to claim 1,
wherein the ongoing state includes a currently opening state and a currently closing state, and
wherein the controller is configured to identify a direction of the movement based on the signal, identify that the frame is in the currently opening state when the identified direction is a first direction, and identify that the frame is in the currently closing state when the identified direction is a second direction,
wherein the currently opening state indicates that the frame is moving away from the base object, and the currently closing state indicates that the frame is moving closer to the base object.

4. The display device according to claim 3, wherein the display panel comprises a backlight unit; and
wherein the controller is configured to control the backlight unit to be dimmed in response to identifying that the frame is in the currently opening state.

5. The display device according to claim 1, wherein the controller is further configured to adjust transparency of the display panel based on the movement state of the frame.

6. The display device according to claim 1,
wherein the ongoing state includes a currently opening state and a currently closing state, and
wherein the detector comprises an inductance sensor,
wherein the controller is configured to identify the frame is in the currently opening state when an inductance value indicated by the signal increases, and identify the frame is in the currently closing state when the inductance value decreases, and wherein the currently opening state indicates that the frame is moving away from the base object, and the currently closing state indicates that the frame is moving closer to the base object.

7. A refrigerator comprising:

a main body comprising a storage chamber and an opening; and a door rotatably mounted to the main body to open or close the opening, wherein the door comprises:

a frame;

a display panel mounted to the frame;

a detector disposed in the frame, and configured to detect a movement of the door and output a signal corresponding to the movement; and a controller configured to identify a movement state of the frame based on the signal output from the detector, and control the display panel based on the movement state, wherein the movement state of the frame includes a complete state and an ongoing state, wherein the complete state includes a completely opened state and a completely closed state, and the ongoing state indicates that the frame is between the completely opened state and the completely closed state, and wherein the controller is further configured to control the display panel to operate differently based on whether the frame is in the completely opened state or in the ongoing state.

8. The refrigerator according to claim 7, wherein the detector is configured to scan an inside of the storage chamber, and wherein the controller is configured to identify an empty region from among plural regions contained in the storage chamber based on a result of scanning by the detector, and control the display panel to display information regarding the identified empty region.

9. The refrigerator according to claim 7, wherein the ongoing state includes a currently opening state and a currently closing state, wherein the controller is further configured to control a position of the frame based on the signal output from the detector, identify the movement state to be the completely opened state when the identified position of the frame is a first target position, identify the movement state to be the completely closed state when the identified position of the frame is a second target position, identify the movement state to be the currently closing state when the identified position of the frame is moving from the first target position to the second target position, and identify the movement state to be the currently opening state when the identified position of the frame is moving from the second target position to the first target position, and wherein the controller is configured to change images displayed on the display panel when the door is identified to be moving based on the signal.

10. The refrigerator according to claim 9, wherein the controller is configured to control the display panel to change currently displayed images in response to identifying the door is continuously moving for a predetermined time period based on the signal.

11. The refrigerator according to claim 7, wherein the controller is configured to control the display panel to display event information when the door is identified to be moving based on the signal.

12. The refrigerator according to claim 7, wherein the controller is configured to control the display panel to display advertisement information when the door is identified to be moving based on the signal.

13. The refrigerator according to claim 7, wherein the display panel is a transparent display panel, and wherein the controller is configured to control a backlight unit of the display panel to be dimmed when the door is identified to be moving based on the signal.

14. The refrigerator according to claim 7, wherein the display panel is a transparent display panel, and wherein the controller is configured to control a backlight unit of the display panel to be turned off when the door is identified to be moving based on the signal.

15. The refrigerator according to claim 7, wherein the detector comprises at least one of an acceleration sensor, a gyro sensor, and a geomagnetic sensor.

16. The refrigerator according to claim 15, wherein the controller is configured to reduce brightness of the display panel in response to identifying the door is continuously moving for a predetermined time period based on the signal.

17. The refrigerator according to claim 7, wherein the ongoing state includes a currently opening state and a currently closing state, wherein the controller is configured to identify a direction of the movement of the door based on the signal, identify that the door is in the currently opening state when the identified direction is a first direction, and identify that the door is in the currently closing state when the identified direction is a second direction, and wherein the second direction indicates that the identified position of the frame is moving from a first target position to a second target position, the first direction indicates that the identified position of the frame is moving from the second target position to the first target position, and wherein the currently opening state indicates that the door is moving away from the main body, and the currently closing state indicates that the door is moving closer to the main body.

18. The refrigerator according to claim 17, wherein the controller is configured to:

in response to the identified direction being the second direction, identify whether there are fluctuations in the signal equal to or more than a predetermined number of times; and in response to identifying there are fluctuations in the signal equal to or more than the predetermined number of times, identify that the door is in the completely closed state.

19. The refrigerator according to claim 7, wherein the ongoing state includes a currently opening state and a currently closing state;

wherein the detector comprises an inductance sensor, and wherein the controller is configured to identify that the door is in the currently opening state, which indicates that the door is moving away from the main body, when an inductance value indicated by the signal increases, and identify that the door is in the currently closing state, which indicates that the frame is moving closer to the main body, when the inductance value decreases.

20. A door comprising:
- a frame configured to be rotatably mountable to a base object;
- a display panel mounted to the frame;
- a detector disposed in the frame, and configured to detect a movement of the frame and output a signal corresponding to the movement; and
- a controller configured to identify a movement state of the frame and a direction of the movement based on the signal, identify whether the door is in a currently opening state or in a currently closing state based on the identified direction, and control at least one of a transparency and displayed image of the display panel based on whether the door is in the currently opening state or in the currently closing state,
- wherein the movement state of the frame includes a complete state and an ongoing state, the ongoing state including the currently opening state and the currently closing state,
- wherein the complete state includes a completely opened state and a completely closed state, and the ongoing state indicates that the frame is between the completely opened state and the completely closed state,
- wherein the controller is further configured to control the display panel to operate differently based on whether the frame is in the completely opened state or in the ongoing state, and
- wherein the currently opening state indicates that the frame is moving away from the base object, and the currently closing state indicates that the frame is moving closer to the base object.

\* \* \* \* \*